(12) United States Patent
Mizuno et al.

(10) Patent No.: US 6,802,657 B2
(45) Date of Patent: Oct. 12, 2004

(54) INSTANT PHOTOGRAPHIC FILM PACK

(75) Inventors: Kazunori Mizuno, Kanagawa (JP);
Hisaaki Sugiyama, Kanagawa (JP);
Toshiyuki Nishiyama, Kanagawa (JP);
Tetsuya Takatori, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 10/376,233

(22) Filed: Mar. 3, 2003

(65) Prior Publication Data

US 2003/0165338 A1 Sep. 4, 2003

(30) Foreign Application Priority Data

Mar. 4, 2002 (JP) .................................... 2002-057741
Feb. 13, 2003 (JP) .................................... 2003-034982

(51) Int. Cl.[7] ............................................. G03B 17/26
(52) U.S. Cl. ................................. 396/518; 396/527
(58) Field of Search ............................ 396/517, 518, 396/519, 520, 524, 527–528, 30, 34, 36–37

(56) References Cited

U.S. PATENT DOCUMENTS

| | | | | | |
|---|---|---|---|---|---|
| 1,368,029 | A | * | 2/1921 | Fawkes et al. | 396/517 |
| 2,978,971 | A | * | 4/1961 | Asano et al. | 396/518 |
| 3,922,700 | A | * | 11/1975 | Asano et al. | 396/518 |
| 3,946,411 | A | * | 3/1976 | Asano et al. | 396/30 |
| 5,881,323 | A | * | 3/1999 | Mizuno et al. | 396/30 |
| 6,195,508 | B1 | | 2/2001 | Katayama et al. | |

FOREIGN PATENT DOCUMENTS

| JP | 2000-089351 A | 3/2000 |
|---|---|---|
| JP | 2000-089354 A | 3/2000 |

* cited by examiner

*Primary Examiner*—Christopher E Mahoney
(74) *Attorney, Agent, or Firm*—Sughrue Mion, PLLC

(57) ABSTRACT

The present invention provides an instant photographic film pack that is loaded in an instant camera. The instant photographic film pack can be produced at low cost, has little environmental impact, and has excellent handling characteristics.

The instant photographic film pack includes a case body which accommodates therein self-developing type film units, has one side thereof open, and has an exposure opening for providing each one of the self-developing type film units with exposure, an ejection slit for ejecting the self-developing type film units after exposure thereof, and a reference surface serving as a reference for location when loaded into the instant camera; a covering portion covering the open side of the case body; and a light-shielding cover covering the exposure opening. The case body and the covering portion are formed of cardboard and/or a cellulose-resin composite or the like.

20 Claims, 25 Drawing Sheets

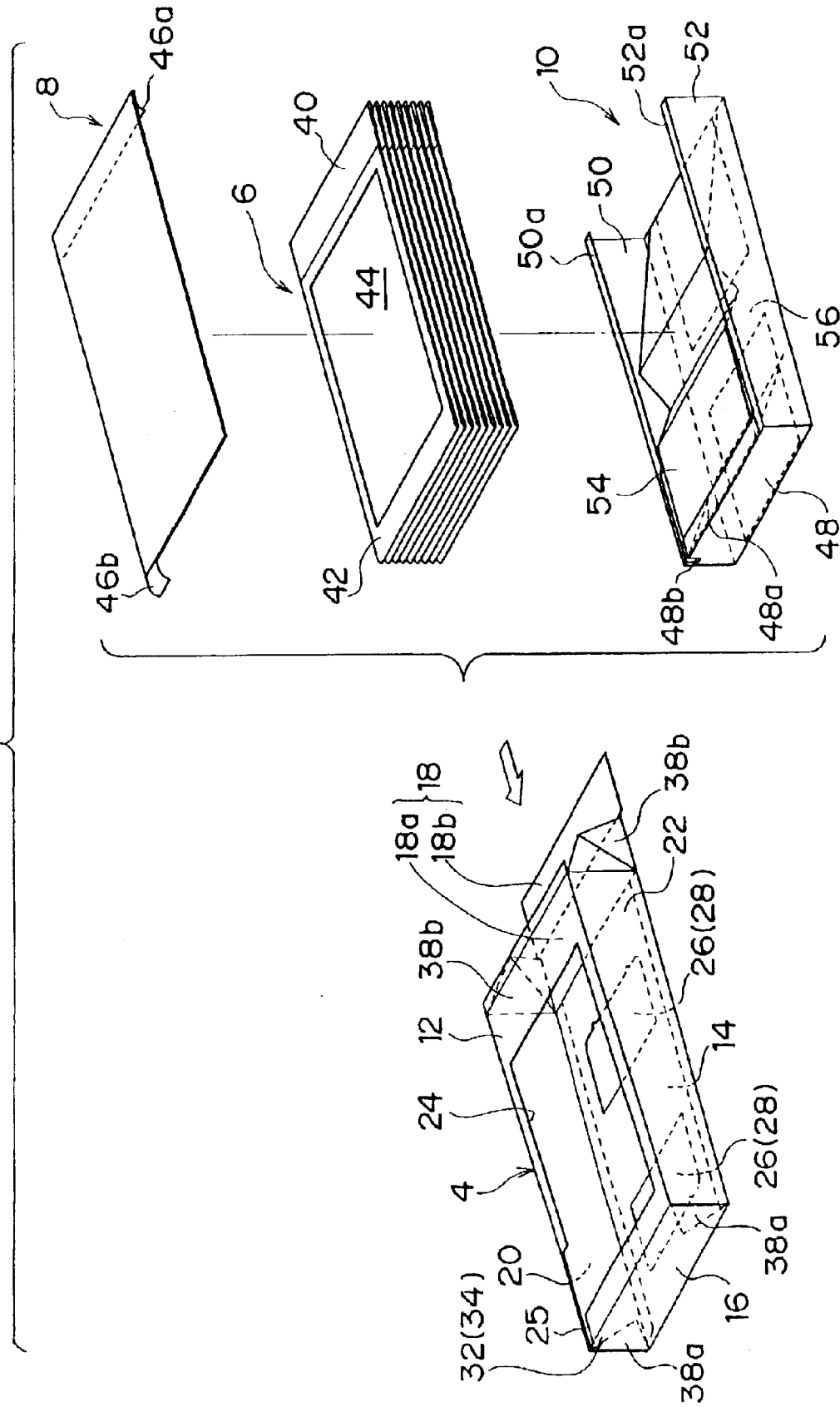

INSTANT PHOTOGRAPHIC FILM PACK

BACKGROUND OF THE INVENTION

1. Field of the Invention

The present invention relates to an instant photographic film pack accommodating an instant film, that is, a self-developing type film unit.

2. Description of the Related Art

Various film packs for use in instant cameras, which accommodate pluralities of mono-sheet type self-developing type film units in box-like cases, have been sold heretofore.

A case of a film pack is generally formed of a plastic endowed with light-shielding ability in a box shape. The case is provided with an exposure aperture for exposing an exposure face of a self-developing type film unit and an ejection aperture for discharging the self-developing type film unit after exposure. The case is also provided with an insertion aperture at which a pusher member, which is disposed in an instant camera and pushes the self-developing type film unit up toward the exposure aperture, is inserted. Further, an exposure aperture cover which is a sheet-like member is accommodated in the case so that the exposure aperture cover is superposed over an array of the self-developing type film units to close the exposure aperture from inside of the case. An insertion aperture cover which is a sheet-like member is also accommodated in the case so as to cover the insertion aperture from inside of the case.

The instant photographic film pack is set in a pack chamber provided in an instant camera. The aforementioned pusher member is attached at a lid member closing the pack chamber of the instant camera. When the lid member is closed, the pusher member is inserted at the insertion aperture of the instant photographic film pack. Then, the exposure aperture cover is ejected from the ejection aperture and the exposure face of the self-developing type film unit is ready to be exposed. When all of the self-developing type film units in the case have been used up and the instant photographic film pack is empty, the instant photographic film pack is taken out from the instant camera and disposed of.

The instant photographic film pack case is formed of plastic, which is discarded as a non-industrial waste and incinerated or filled in the ground. Currently, plastic products, which are formed from plastics produced from mined resources such as oil, are widely used. Such resources are referred to as non-renewable resources, and will eventually be depleted. Furthermore, discarded plastic products are incinerated discharging carbon dioxide and the like into the atmosphere, and therefore, are considered to be one of the major cause of deterioration of the environment.

Correspondingly, efforts for dealing with environmental problems on the part of the whole society have been demanded recently. For manufacturers and vendors, it is becoming to be a social responsibility to produce and retail products having less environmental impact. On the other hand, products of high cost will not sell well even if they have low environmental impact. Therefore, production of environmentally friendly products at an appropriate cost is also strongly demanded.

Consequently, various attempts have been made for realizing an instant photographic film pack that is environmentally friendly and easy to handle and can be produced at a low cost.

SUMMARY OF THE INVENTION

An object of the present invention is to solve the problems described above, especially, to provide an instant photographic film pack that not only can be produced at a low cost, but also gives low environmental impact as well as is easy to handle. A specific object of the present invention is to provide an instant photographic film pack that can be easily discarded or recycled after use.

A first aspect for achieving these objects relates to an instant photographic film pack loaded in an instant camera comprising: a case body which accommodates therein a plurality of self-developing type film units, has one side thereof open, and has an exposure opening for providing each one of the self-developing type film units with exposure, and a reference surface serving as a reference for location when the instant photographic film pack loaded into the instant camera; a covering portion covering the open side of the case body to form a box body; and a light-shielding cover covering the exposure opening and blocking light, wherein the case body and the covering portion being formed of a paper material.

When the instant photographic film pack is loaded into an instant camera, the case body is fixed into a pack chamber of the instant camera and the reference surface of the case body abuts the inner wall of the pack chamber to locate the instant photographic film pack in the pack chamber.

When a photograph is taken, the light-shielding cover is removed from the exposure opening to expose the exposure surface of a self-developing type film unit. Then, a shutter of the instant camera is released and the exposure surface is exposed to form a latent image thereon.

The exposed self-developing type film unit is discharged through the ejection slit to the outside of the instant camera and automatically developed to form a positive image on an image-forming surface located opposite from the exposure surface.

The case body and the covering portion, which are discarded after use of the instant photographic film pack, are formed of a paper material and can be burnt generating a small amount of heat and gas. Therefore, a discarded instant photographic film pack can be incinerated easily.

Accordingly, the instant photographic film pack can be disposed of incineration or in a land fill with a much smaller environmental impact compared with a conventional instant photographic film pack.

The paper material includes cardboard and a cellulose-resin composite.

The cellulose-resin composite is a composite material mainly composed of a cellulose fiber and a thermoplastic resin. An antioxidant and an aldehyde-neutralizing agent can be added to the cellulose-resin composite as described in the specification of the Japanese Patent Application No. 2001-378198. An amount of the cellulose fiber in the cellulose-resin composite is preferably 25 parts by weight or more, more preferably 51 parts by weight or more per 100 parts by weight of the total amount of the cellulose-resin composite. In view of printability, dimensional accuracy, and easiness of incineration, the weight ratio of the cellulose fiber to the thermoplastic resin is especially preferably from 51:49 to 75:25.

A cellulose fiber that can be blended in the cellulose-resin composite includes a waste paper pulp obtained by crushing, beating, or refining a waste photographic paper or other kinds of waste wood-free paper, a wood pulp, and a non-wood pulp obtained from paper mulberry, mitsumata plant, kenaf, sugar cane, or bamboo tree.

A thermoplastic resin that can be blended is preferably a polyolefine resin in that a polyolefine resin can be incinerated without generating any poisonous gas. Preferable examples especially include a polyethylene resin such as high-density polyethylene, low-density polyethylene, ultra low-density polyethylene, a polypropylene resin and an ethylene-propylene copolymer resin.

The cellulose-resin composite includes a paper-resin mentioned below as well as a heat-pressed sheet made by heat-pressing a paper made from a pulp of the cellulose fiber and a pulp of the thermoplastic resin and a layered sheet made by layering and heat-pressing a cellulosic paper made from the cellulose fiber and a resin paper made from a fiber of the thermoplastic resin. For making the heat-pressed sheet or the layered sheet, the paper(s) are preferably heat-pressed at a temperature wherein the thermoplastic is molten and penetrates between the cellulose fiber.

The cardboard includes a conventional cardboard made from a common wood pulp as well as a cardboard made from the above-mentioned waste paper-pulp or non-wood pulp.

A second aspect for achieving these objects relates to the instant photographic film pack of the first aspect, wherein the covering portion comprises a first insertion opening and a first light-shielding piece, the first insertion opening including an opening portion through which a pusher member of an instant camera is inserted to the inside of the case body to push the self-developing type film units toward the exposure opening of the case body when the instant photographic film pack is loaded in the instant camera, and the first light-shielding piece including a flap-like member which covers the first insertion opening to shield light and being formed so as to fold inside to open the first insertion opening when the pusher member is inserted at the first insertion opening.

The first insertion opening is closed by the first light-shielding piece until the instant photographic film pack is loaded in the instant camera.

When the instant photographic film pack is loaded in the instant camera, the pusher member provided in the instant camera pushes up the first light-shielding piece inside of the case body to open the first insertion opening and penetrate inside of the case body through the first insertion opening. The first light-shielding member is pushed up by the pusher member to push the self-developing-type film units accommodated in the case body toward the exposure opening thereof.

The first light-shielding piece can be formed integrally with the covering portion by forming a continuous or broken cut line around the first insertion opening on the covering portion and making perforations at an area where the cut line is broken. Instead of making a cut line around the first insertion opening, a member forming the first light-shielding member can be fixed inside of the covering portion next to the first insertion opening. The member is also preferably made of a cardboard or a cellulose-resin composite sheet that is black or dark colored.

A third aspect for achieving these objects relates to the instant photographic film pack of the second aspect, wherein the case body comprises a second insertion opening and a second light-shielding piece, the second insertion opening including an opening portion through which a pushing-out member of an instant camera is inserted inside the case body to push the self-developing type film units out toward the ejection opening of the case body when the instant photographic film pack is loaded into the instant camera, and the second light-shielding piece including a flap-like member which covering the second insertion opening to shield light and which is formed so as to open the second insertion opening when pushed by the pushing-out member.

When photo-taking is finished, the pushing-out member disposed in the instant camera is inserted from the second insertion opening into the inside of the case body and a self-developing type film unit that has been exposed is pushed from the ejection slit out of the instant photographic film pack.

The second light-shielding piece includes a flap or others having any form as long as it can cover the second insertion opening. Preferable examples of the second light-shielding piece especially include a thin flap of a black film disposed to the light-shielding cover so as to covering the second insertion opening when the light-shielding cover is closing the exposure opening of the case body.

A fourth aspect for achieving these objects relates to the instant photographic film pack of the third aspect, wherein the light-shielding cover is formed to be ejectable from the ejection slit of the case body.

When the above instant photographic film pack being set in an instant camera and photo-taking is started, the pushing-out member disposed in the instant camera pushes a second light-shielding member to open the second insertion opening and the pushing-out member is inserted into the inside of the case body. Then, the pushing-out member pushes a light-shielding cover out of the instant photographic film pack through an ejection slit to expose an exposing surface of a self-developing type film unit so that the self-developing type film unit can be exposed. Once the light-shielding cover is pushed out through the ejection slit, the pushing-out member returns to its waiting position to make the instant photographic film unit ready for photo-taking.

When photo-taking is finished, the pushing-out member is inserted from the second insertion opening into the inside of the case body and push the exposed self-developing type film unit out of the instant-photographic film pack through the ejection slit.

A fifth aspect for achieving these objects relates to the instant photographic film pack of the fourth aspect, wherein a specific decoration is printed on an outside surface of at least one of the covering portion and the case body.

A specific decoration composed of at least one of the letters and figures is printed on the outside surface of the case body or the covering portion or the both, and therefore, the decoration makes the appearance of the instant photographic film pack more attractive.

Correspondingly, an instant photographic film pack having a decoration related to an event printed on its surface is suitable for a free souvenir delivered in the event. Additionally, an instant photographic film pack having a logo of a specific company or a specific product printed on its surface can be suitably delivered as an advertisement.

A sixth aspect for achieving these objects relates to the instant photographic film pack of the fifth aspect, wherein the decoration is printed on an area outside of an image-forming surface which is disposed on a side of the self-developing type film units opposite from the exposure surface thereof.

A self-developing type film unit having a frame-like decoration around an image-forming surface thereof gives an appearance as if an image on the image-forming surface were fixed into a frame when the image appears on the image-forming surface. Therefore, the decoration around the image-forming surface of the self-developing type film unit gives additional attractiveness to the self-developing type film unit. Thus, the instant photographic film pack provides users with other pleasures than a pleasure that they can see a photograph soon after photo-taking. Accordingly, the instant photographic film unit can meet various needs of different users.

Particularly, an instant photographic film pack having decoration printed on an outside surface of at least one of a case body and a covering portion thereof with the same motif as a decoration printed on self-developing type film units inside the case body is thought to be more attractive to users since the decorations on the case body, on the covering portion, and on the self-developing type film units inside remind them a continuing story. Accordingly, putting the decorations on the case body, on the covering portion, and on the self-developing type film units inside can be expected to improve the sales of the instant photographic film pack.

A seventh aspect for achieving these objects relates to the instant photographic film pack of the third aspect, wherein the case body and the covering portion are formed by folding a single continuous fold-out sheet of the paper material.

An eighth aspect for achieving these objects relates to the instant photographic film pack of the fifth aspect, wherein the case body and the covering portion are formed by folding a single continuous fold-out sheet of the paper material.

The case body and the covering portion of the instant photographic film pack are formed by folding a one-piece fold-out sheet wherein openings such as the exposure opening and the ejection slit are formed in advance.

Accordingly, compared with assembling an instant photographic film pack by attaching side wall portions and a bottom portion separately formed of cardboard to each other to form a case body and a covering portion and then, attaching the case portion to the covering portion, the instant photographic film pack of the present aspect can be assembled more easily, and therefore, the production cost thereof can be reduced.

The fold-out sheet can be made of cardboard as well as a sheet of s cellulose-resin composite.

A ninth aspect for achieving these objects relates to the instant photographic film pack of the seventh aspect, wherein the fold-out sheet is formed of cardboard having one layer or two or more layers.

The instant photographic film pack is preferable in that cardboard is easy to cut into the fold-out sheet. Additionally, the fold-out sheet formed of cardboard is easy to fold into a case body and a covering portion. The cardboard can comprise a printing layer and a light-shielding layer.

A tenth aspect for achieving these objects relates to the instant photographic film pack of the ninth aspect, wherein the fold-out sheet comprises a light-shielding layer and a printing layer having an outside surface suitable for printing.

The case body and the covering portion of the instant photographic film pack related to the present aspect are formed by folding a fold-out sheet having a light-shielding layer and a printing layer with a surface suitable for printing. Thus, the instant photographic film pack has an excellent light-shielding property and an excellent printability. Accordingly, it is effectively prevented that the self-developing film units accommodated inside the case body are exposed previously from photo-taking to form fogging as well as an attractive decoration can be easily printed on a surface of the case body.

An eleventh aspect for achieving these objects relates to the instant photographic film pack of the tenth aspect, wherein the fold-out sheet comprises a folding portion that is folded inside or outside to form a corner portion of the case body and the covering portion.

In the instant photographic film pack of the present aspect, by folding the folding portion inside or outside, two adjacent side portions of the case body and the covering portion and a corner therebetween are formed.

Accordingly, without forming any cut that is commonly seen in a cardboard box, the corner of the case body and the covering portion can be formed, and therefore, the case body and the covering portion of the above instant photographic film pack has a particularly excellent light shielding property.

In addition, by folding the folding portion toward the inside to locate the folding portion inside of the case body, the instant photographic film pack can be provided with a smooth outer surface. Thus, the instant photographic film pack has an excellent appearance. On the other hand, by folding the folding portion outside to locate the folding portion outside the case body, the instant photographic film pack can be provided with a smooth inner surface. Therefore, self-developing type film units can be precisely located in the case body and ejected smoothly from the ejection slit.

A twelfth aspect for achieving these objects relates to the instant photographic film pack of the third aspect, wherein the case body is formed of a cellulose-resin composite that is a composite of a cellulose fiber and a thermoplastic resin and the covering portion is formed of cardboard.

The instant photographic film pack of the present aspect has a case body formed of the cellulose-resin composite and a covering portion formed of the cardboard.

The cellulose-resin composite has a structure wherein a matrix of the thermoplastic resin is reinforced with a dispersed phase of the cellulose fiber and thus has a higher rigidity than the thermoplastic resin itself.

Accordingly, a case body formed of a cellulose-resin composite wherein a polyolefine resin is employed as the thermoplastic resin has a rigidity as high as that of a case body formed of a polystyrene resin having a high rigidity. Consequently, a case body formed of the cellulose-resin composite has the same or higher dimensional accuracy than a conventional case body formed of a polystyrene resin, and thus, the instant photographic film pack having the case body has as high location accuracy as a conventional instant photographic film pack.

In addition, a discarded instant photographic film pack can be easily incinerated because less heat and almost no poisonous gas are generated during incineration.

Further, a mixture of the cellulose fiber and the thermoplastic is prepared by crushing and kneading a used-up instant photographic film pack. The resultant mixture has almost the same composition except that a proportion of the cellulose fiber increases. Thus, after adjusting the composition by adding an extra amount of thermoplastic resin, a material recycled from a used-up instant photographic film pack can be used again as the cellulose-resin composite for forming the case body. Therefore, the cellulose-resin composite can be easily recycled.

The cellulose-resin composite additionally can be easily and firmly bonded to the cardboard with a hot-melt adhesive or a cold glue generally used for making a cardboard box or a corrugated fiberboard container and thus the case body can be easily bonded to the covering portion.

Both the cellulose-resin composite and the cardboard have an excellent printability and consequently, a decoration or a pattern of different letters and figures can be easily printed by a common offset printer on the case body and the covering portion. Therefore, an instant photographic film pack with an attractive decoration or a pattern can be produced at a low cost.

Additionally, instant photographic film packs having a different design can be easily manufactured by covering the case body by a covering portion having a different decoration.

A thirteenth aspect for achieving these objects relates to the instant photographic film pack of the third aspect, wherein both the case body and the covering portion are formed of a cellulose-resin composite that is a composite of a cellulose fiber and a thermoplastic resin.

Not only a case body but the covering portion of the instant photographic film pack of the present aspect are formed of the above cellulose-resin composite and thus, the instant photographic film pack has higher location accuracy than the instant photographic film pack of the twelfth aspect. The case body and the covering portion can be formed of the same material and thus, there is no necessity of using different materials for forming the case body and the covering portion. Additionally, by employing the below-mentioned paper resin as the cellulose-resin composite, both the case body and the covering portion can be formed by injection moulding. Thus, without major reforming, conventional injection moulding facility can be used for manufacturing the instant photographic film pack of the present invention.

A fourteenth aspect for achieving these objects relates to the instant photographic film pack of the twelfth aspect, wherein the covering portion is formed by folding a single continuous fold-out sheet of cardboard.

The covering portion has a top portion covering the open side of the case body and side portions extending to the top portion and covering the side of the case body. The covering portion sometimes also has a bottom portion covering the surface of the case body facing toward the open side.

The covering portion of the instant photographic film pack can be formed by folding up a one-piece fold-up sheet having a cut and an opening formed in advance. Thus, the covering portion can be assembled without bonding the top portion, the side portions, and the bottom portion, all of which are formed separately from cardboard, to each other, and therefore, the process for producing the covering portion includes fewer steps and the production cost can be reduced.

A fifteenth aspect for achieving these objects relates to the instant photographic film pack of the fourteenth aspect, wherein the covering portion is formed so as to cover the entire case body from outside.

In the instant photographic film pack of the present aspect, the case body is covered entirely by the covering portion. Accordingly, even when the case body is formed of a black or dark gray-coloured cellulose-resin composite, by covering the case body by the covering portion formed of a cardboard and having a decoration of different letters and figures printed on the outer surface thereof, an instant photographic film pack having an excellent light-shielding property and an excellent attractiveness can be provided.

A sixteenth aspect for achieving these objects relates to the instant photographic film pack of the twelfth aspect, wherein the cellulose fiber is blended in the cellulose-resin composite so that a proportion of the cellulose fiber is 51 weight-% or more in a total weight of the case body formed of the cellulose-resin composite and the covering portion formed of the cellulose-resin composite or the cardboard.

A seventeenth aspect for achieving these objects relates to the instant photographic film pack of the thirteenth aspect, wherein the cellulose fiber is blended in the cellulose-resin composite so that a proportion of the cellulose fiber is 51 weight-% or more in a total weight of the case body formed of the cellulose-resin composite and the covering portion formed of the cellulose-resin composite or the cardboard.

The above cellulose-resin composite has a high rigidity, printability, and dimensional accuracy. Thus the case body of the above instant photographic film pack has an accurate reference surface. Additionally, the case body and the covering portion can be easily formed by injection-moulding or heat-pressing the cellulose-resin composite.

Further, 51% or more of the total weight of the case body and the covering portion is the cellulose fiber and thus, the instant photographic film pack of the present aspect can be easily incinerated or land-filled after discarding. In addition, a cellulose-resin composite prepared by crushing and kneading a used instant photographic film pack is preferably used for forming the case body and the covering portion.

An eighteenth aspect for achieving these objects relates to the instant photographic film pack of the twelfth aspect, wherein the cellulose fiber is blended in the cellulose-resin composite so that a proportion of the cellulose fiber is 51:49 to 75:25 weight-% in a total weight of the case body formed of the cellulose-resin composite and the covering portion formed of the cellulose-resin composite or the cardboard.

A nineteenth aspect for achieving these objects relates to the instant photographic film pack of the thirteenth aspect, wherein the cellulose fiber is blended in the cellulose-resin composite so that a proportion of the cellulose fiber is 51:49 to 75:25 weight-% in a total weight of the case body formed of the cellulose-resin composite and the covering portion formed of the cellulose-resin composite or the cardboard.

The above cellulose-resin composite not only has an excellent rigidity, printability, dimensional accuracy and easiness for incineration but also can be easily formed into the case body or covering portion by injection moulding or heat-pressing.

A twentieth aspect for achieving these objects relates to the instant photographic film pack of the twelfth aspect, wherein the cellulose-resin composite is a paper-resin compound material prepared by kneading thermoplastic resin pellets and cellulose fiber pellets formed by crushing, compressing and granulating a source paper.

A twenty-first aspect for achieving these objects relates to the instant photographic film pack of the thirteenth aspect, wherein the cellulose-resin composite is a paper-resin compound material prepared by kneading thermoplastic resin pellets and cellulose fiber pellets formed by crushing, compressing and granulating a source paper.

The above paper-resin can be moulded into the case body and the covering portion by conventional injection-moulding and thus a conventional injection-moulding facility can be used almost no reform for forming the case body and the covering portion of the instant photographic film pack of the present invention. Consequently, huge facility investment is not required.

Additionally, a case body formed by injection-moulding has a high dimensional accuracy and thus, the instant photographic film pack of the present aspect has a high locating accuracy when loaded in an instant camera.

BRIEF DESCRIPTION OF THE DRAWINGS

FIG. 2 is an exploded view showing a structure of the instant photographic film pack illustrated in FIG. 1.

DESCRIPTION OF THE PREFERRED EMBODIMENTS

A First Embodiment

Figure 1A:
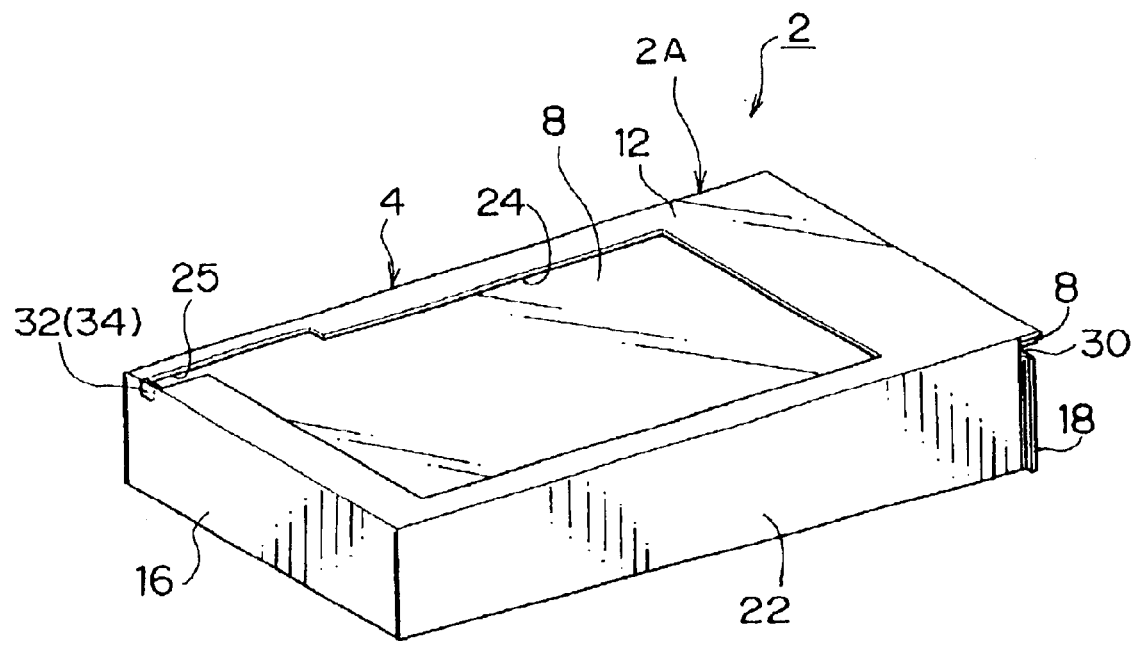
FIGS. 1A and 1B are perspective views showing exterior of an instant photographic film pack relating to a first embodiment.
Figure 1B:
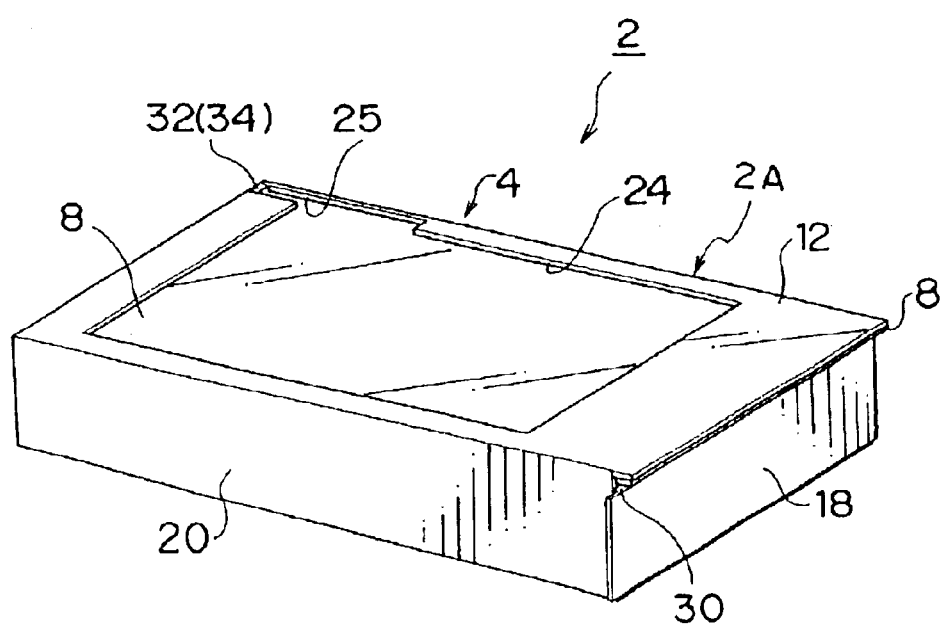
Figure 3:
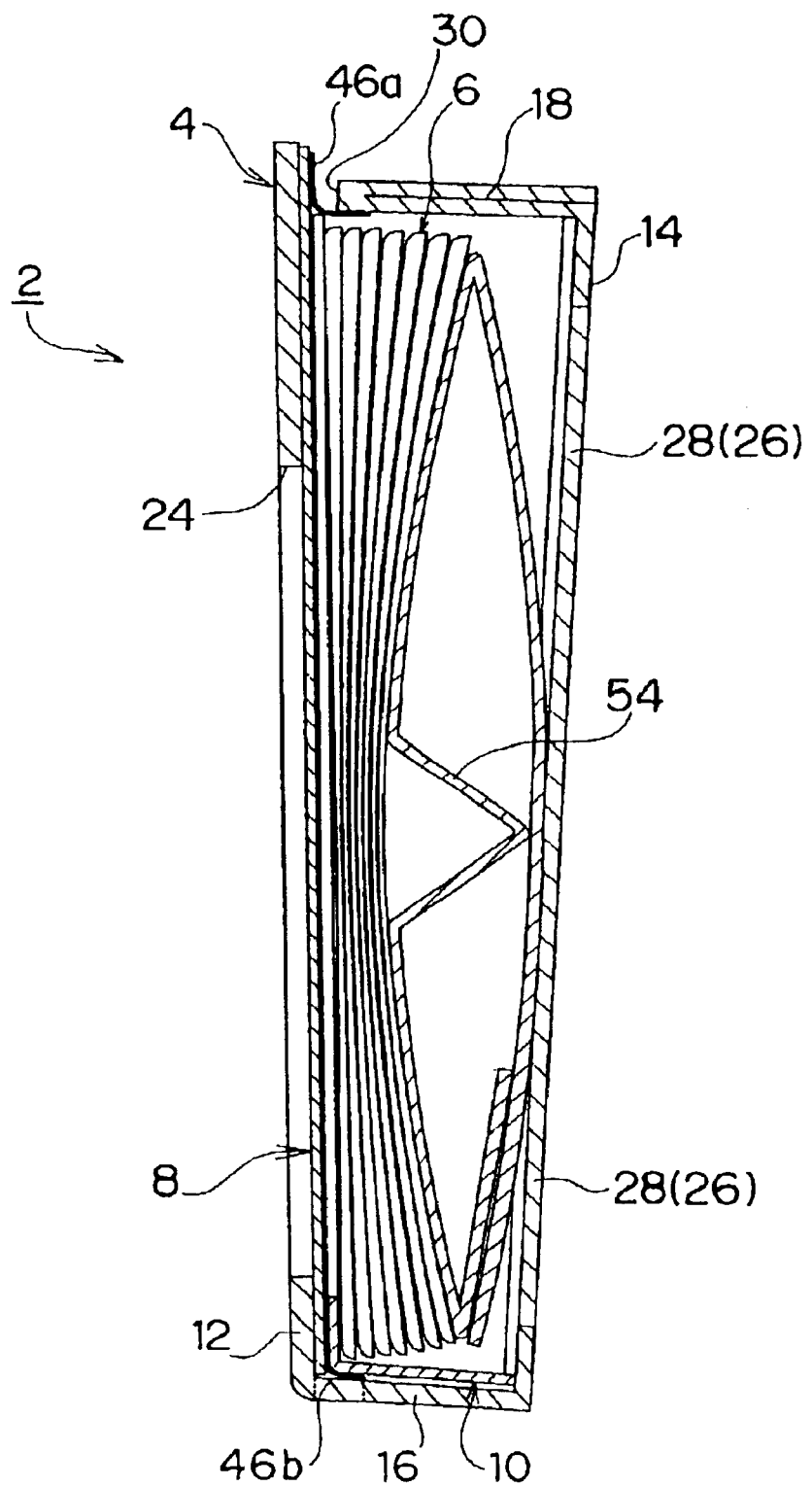
FIG. 3 is a sectional view showing the structure of the instant photographic film pack illustrated in FIG. 1.

As shown in FIGS. 1A, 1B, 2 and 3, an instant photographic film pack 2 relating to a first embodiment has a case 2A which accommodates a plurality of instant films 6. The case 2A has a substantially box-shaped case body 4, a light-shielding cover 8 and an inner box 10.

The instant film 6 is a self-developing type film unit of a well-known mono-sheet type. In the instant film 6, a photosensitive sheet on which a latent image is formed by exposure is superposed with a cover sheet which neutralizes a development processing fluid after a certain period of time. A pod portion 40 and a trap portion 42 are provided at end portions of the instant film 6. A developer pod, which includes the development processing fluid, is integrally provided at the pod portion 40, and an absorbing member, which absorbs an excess portion of the development processing fluid after spreading processing, is integrally provided at the trap portion 42. After exposure has been carried out on an exposure surface 44 of the instant film 6, the developer pod of the pod portion 40 is squeezed by a pair of spreading rollers, the development processing fluid flows out between the two sheets and is spread to a substantially constant thickness, and the development processing is carried out. After the processing fluid has been spread, and a predetermined development and fixing period has passed, a positive image appears at a surface at a side of the instant film 6 that is opposite to the side on which the exposure surface 44 is provided.

The case body 4 is structured with a top plate 12, a bottom plate 14, and side plates 16, 18, 20 and 22. The bottom plate 14 faces the top plate 12. The side plates 16 to 22 connect between the top plate 12 and the bottom plate 14, to form a box.

An exposure opening 24, which exposes the exposure surface 44 of the instant film 6, and a cutaway 25 are formed in the top plate 12. A pushing-out member such as a hook-like member 64 mentioned below or the like, which pushes the instant film 6 toward an ejection opening 30 can be inserted at the cutaway 25.

Two insertion apertures 26 and two light-shielding pieces 28 are provided at the bottom plate 14. The light-shielding pieces 28 cover the insertion apertures 26, and shield light. The insertion apertures 26 are an example of the first insertion opening in the instant photographic film package relating to the present invention. When the instant photographic film pack 2 is loaded to an instant camera 1000, pusher members 72 of the instant camera 1000 are inserted through the insertion apertures 26 and push the film toward the exposure opening 24, as described later. The light-shielding pieces 28 are an example of a first light-shielding piece in the film cases and film packages relating to the present invention.

The side plate 16 is adjacent to a side of the top plate 12 on which side the cutaway 25 is formed. A single insertion aperture 32, through which the pushing-out member is inserted for pushing the instant film 6 out toward the ejection opening 30, is formed in the side plate 16. The side plate 16 also includes a single light-shielding piece 34, which covers the insertion aperture 32 and shields light. The insertion aperture 32 is an example of a second insertion opening of the instant photographic film pack relating to the present invention, and is formed to communicate with the cutaway 25. The light-shielding piece 34 is an example of the second light-shielding piece of the film cases and film packages relating to the present invention.

The ejection opening 30, which is an example of the ejection slit of the instant photographic film pack of the present invention and through which the instant film 6 is ejected after exposure, is formed in the side plate 18, which opposes the side plate 16.

Figure 4:
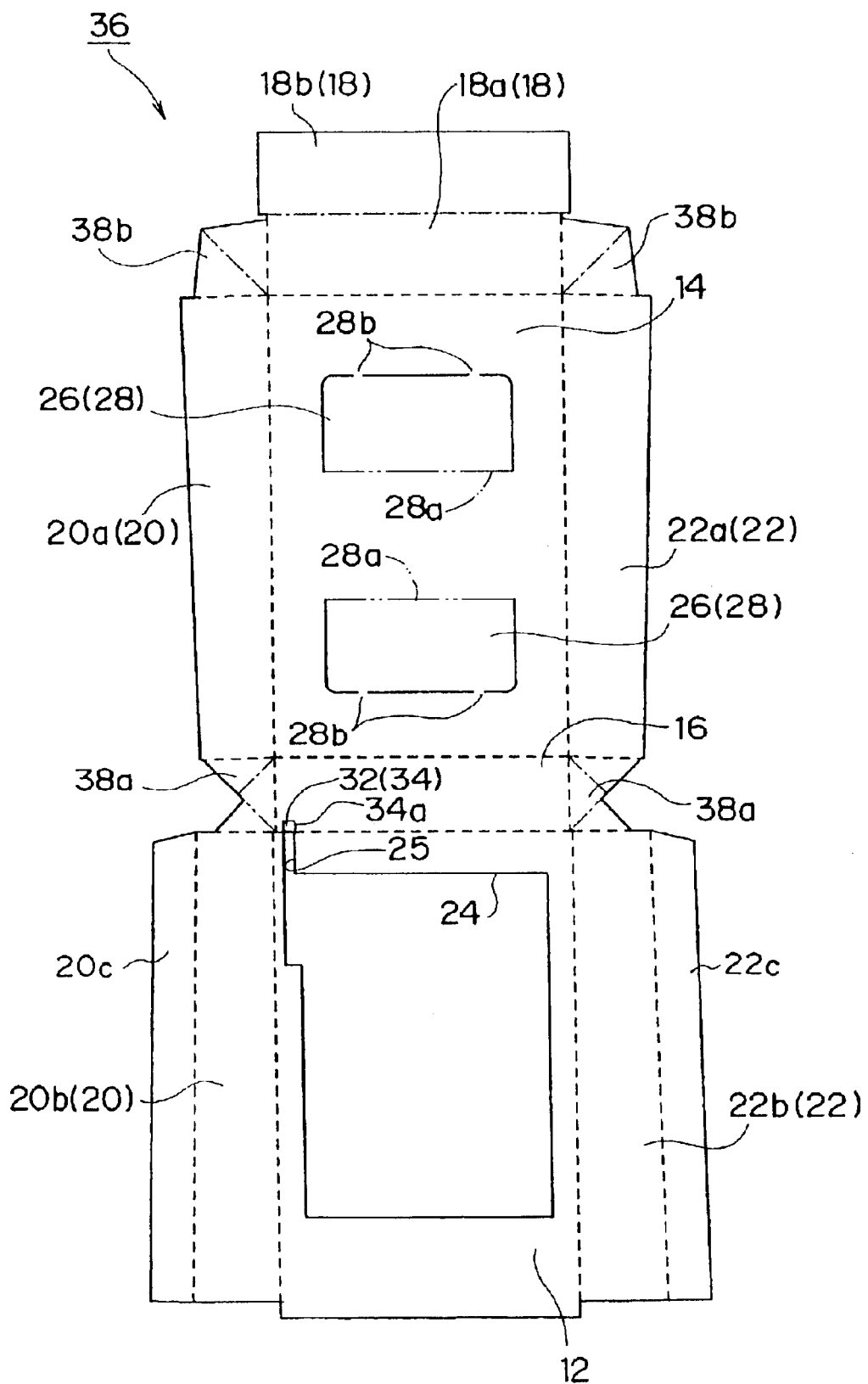
FIG. 4 is a development of a case of the instant photographic film pack illustrated in FIG. 1.

The case body 4 is formed by folding up a fold-out sheet 36, which is a sheet of a paper-related material which has been stamped out in the shape shown in FIG. 4.

A method of folding the fold-out sheet 36 is as described below.

First, the fold-out sheet 36 is folded up such that the top plate 12 and the bottom plate 14 oppose one another. Next, a peripheral edge portion 20a and a peripheral edge portion 20b are folded up, superposed and adhered to form the side plate 20. In the same way, a peripheral edge portion 22a and a peripheral edge portion 22b are folded up, superposed and adhered to form the side plate 22. A peripheral edge portion 20c and a peripheral edge portion 22c are folded up and adhered to the bottom plate 14, respectively. Thus, the side plate 20 and the side plate 22 are fixed to the bottom plate 14. Next, folding portions 38a, which are formed to join the side plate 20, the side plate 22, and the side plate 16, are folded inside, abutted at inner walls of the case body 4, and adhered. Thus, the side plate 20 is made orthogonal to the side plate 16 and the side plate 22 is made orthogonal to the side plate 16.

When the top plate 12, the bottom plate 14, the side plate 20, the side plate 16 and the side plate 22 have been formed, the inner box 10 is accommodated in the case body 4. The inner box 10 contains a predetermined number of the instant films 6 and the light-shielding cover 8 so that the light-shielding cover 8 superposed over a pile of the instant films 6. Then, a peripheral edge portion 18a and a peripheral edge portion 18b of the fold-out sheet 36 are folded up, superposed and adhered. Thus, the side plate 18 is formed. At this time, folding portions 38b, which are formed to join the side plate 18 and the neighboring side plate 20 as well as to join the side plate 18 and the neighboring side plate 22, are folded inside, abutted against inner walls of the case body 4, and adhered. Consequently, the side plate 18 is folded up so that a gap is formed between an edge portion of the side plate 18 and a surface of the top plate 12. Thus, the ejection opening 30 is formed between the side plate 18 and the top plate 12.

Examples of the paper-related material that is utilized for the fold-out sheet 36 include various cardboard, paper-resin compound materials, and the like.

Examples of the cardboard include liners, cardboard's used for paper containers such as white cardboard's, including manila board, white board and the like.

Examples of paper-resin compound material include materials prepared by making a short-fiber of polyolefin resin and a cellulose fiber pulp into a paper together. The polyolefin-resin includes polypropylene, polyethylene, an ethylene-propylene copolymer or the like. The cellulose fiber pulp includes a wood pulp or the like. The examples of paper-resin compound material also include extrusion-formed sheets formed by extruding kneaded pellets of a mixture of the polyolefine-related resin and the cellulose fiber pulp. When preparing the former materials, the polyolefin-related resin may be impregnated into the wood pulp by heating after paper-making.

A ratio of cellulose fiber pulp in the paper-resin compound material is preferably at least 50% by weight, and particularly preferably 51 to 75% by weight.

For the fold-out sheet 36, not only a sheet of a single layer formed from the paper-related material but also a sheet formed of two or more layers, including the paper-related material, may be employed. In addition, surfaces may be covered with a coating layer endowed with humidity resistance and heat-sealing properties. This covering layer may have a light-shielding property.

A fold-out sheet having a white or colored paper-resin compound material or the like outside the case body 4 and having a black layer inside thereof can be employed as the fold-out sheet 36 having two or more layers. This black layer may be formed, for example, by coating one face of the cardboard or paper-resin compound material sheet with a polyethylene (PE), an orientated polypropylene (OPP) or the like which is colored black by mixing carbon black therein.

Other examples of the fold-out sheet 36 include a fold-out sheet formed from a black paper-related material, to which a paper with high printability, such as high quality paper, is adhered.

These fold-out sheets 36 may be endowed with humidity resistance and heat-sealing properties by coating surfaces with a PE layer, an OPP layer or the like. Further, light-shielding properties may be endowed thereto by vapor-depositing aluminium, laminating aluminium foil, or the like on the PE layer or the OPP layer or the like.

Thus, the case body 4 is formed by folding up portions of the single fold-out sheet 36 corresponding to the top plate 12, the bottom plate 14, the side plates 16 to 22, and the like, the fold-out sheet 36 having been provided in advance with the exposure opening, incised portions corresponding to other requirements, and the like. Therefore, the number of steps can be reduced and thus, the cost for production can also be reduced.

Corner portions of the case body 4 are formed by folding the folding portions 38a and 38b, which are formed joining the side plates 16 to 22, to the inside, abutting the folding portions 38a and 38b against the inner walls of the case body 4, and adhering the same. As a result, because the corner portions are structured without forming incisions or the like so as to resemble a sack box or the like, the case body 4 has high light-shielding ability. Moreover, because outer walls of the case are smooth surfaces, an excellent external appearance is provided. Furthermore, the fact that the top plate 12, the side plates 16 to 22 and the bottom plate 14 of the case body 4 can be printed with a continuous pattern is preferable.

The folding portions 38a and 38b may be folded to the outer side and abutted against the outer walls of the case body 4. If the folding portions 38a and 38b are disposed at the outer side of the case body 4, then the inner walls of the case body 4 will be smooth surfaces and, for example, positioning of the instant films 6 in the interior of the case body 4 can be carried out properly.

The side plate 18 of the case body 4 is formed by folding and mutually superposing the peripheral edge portion 18a and the peripheral edge portion 18b, and similarly, the side plate 20 and the side plate 22 are formed by folding and mutually superposing, respectively, the peripheral edge portion 20*a* with the peripheral edge portion 20*b* and the peripheral edge portion 22*a* with the peripheral edge portion 22*b*. Therefore, the side plates 18, 20 and 22 have high stiffness, and the instant photographic film pack 2 is less susceptible to deformation. Moreover, for example, loads from outside on the instant films 6 accommodated inside the case body 4 can be alleviated, and misplacement or the like when the case body 4 is inserted into a pack-loading chamber 60 of a camera apparatus, such as the instant camera 1000, a camera pack or the like, can be prevented. The side plates 18 to 22 are not limited to double-walled structures. Three-wall structures, and layered structures having more than three layers are also possible.

The light-shielding piece 34 and the insertion aperture 32 may be formed in the side plate 16 of the case body 4 by, for example, incision or the like at a portion of a region of the fold-out sheet 36 that corresponds to the side plate 16. The light-shielding piece 34 and the insertion aperture 32 are examples of, respectively, the second light-shielding piece and the second insertion opening of the instant photographic film pack relating to the present invention.

Until the pusher member is inserted at the insertion aperture 32, the light-shielding piece 34 covers and shades the insertion aperture 32. However, when the pusher member is inserted, a joining portion 34*a*, which is a boundary that forms a connection between the side plate 16 and the light-shielding piece 34, is folded, and the insertion aperture 32 is opened. The joining portion 34*a* is structured in a hinge form such that the joining portion 34*a* can be easily folded when the pusher member is inserted.

The joining portion 34*a* may be provided at two or more locations. In such a case, the joining portions 34*a* may be formed such that when the pusher member is inserted, one of the joining portions 34*a* is folded and others thereof are broken, or such that the joining portions 34*a* are all broken and the light-shielding piece 34 is separated from the side plate 16. The joining portions 34*a* that are to break can be easily formed by, for example, providing scored portions when incisions are formed in the fold-out sheet 36, or the like. Therefore, the insertion aperture 32 can be provided in a simple structure and covered and shielded by the light-shielding piece 34 and thus no specific member is needed to attach for closing the insertion aperture 32.

The insertion aperture 26, and the light-shielding piece 28 which covers and shades the insertion aperture 26, can be respectively formed at two locations in the bottom plate 14 of the case body 4 by forming incisions at portions of a region of the fold-out sheet 36 that corresponds to the bottom plate 14. The insertion apertures 26 and the light-shielding pieces 28 are examples of, respectively, the first insertion opening and the first shielding piece of the film cases and film packs relating to the present invention.

Until the pusher members 72 are inserted at the insertion apertures 26, the light-shielding pieces 28 cover and shade the insertion apertures 26. When the pusher members 72 are inserted, joining portions 28*a* (first connecting portions), which are boundaries that form connections between the bottom plate 14 and the light-shielding pieces 28, are folded, pairs of joining portions 28*b* (first connecting portions) are broken, and the insertion apertures 26 are respectively opened. The joining portions 28*a* are preferably structured in a hinge form so that the joining portions 28*a* can be easily folded when the pusher members 72 are inserted. Moreover, the joining portions 28*b* that are to break are not limited to pairs. The joining portions 28*b* may be provided singly, or in sets of three or more.

If the joining portions 28*a* and 28*b* are provided at two or more locations of one or other of the insertion apertures 26, the joining portions 28*a* and 28*b* may be formed so that when one of the pusher members 72 is inserted at that insertion aperture 26, one of the joining portions 28*a* and 28*b* is folded and the others thereof are broken. The joining portions 28*a* and 28*b* also can be formed so that all of them are broken and the light-shielding piece 28 is separated from the bottom plate 14. The joining portions 28*b* that are to break can be easily formed by, for example, providing scored portions when incisions are formed in the fold-out sheet 36, or the like. Therefore, the insertion aperture 26 can be provided with a simple structure, and can be covered and shielded by the light-shielding pieces 28 and thus, no specific member is needed to attach for providing the light-shielding pieces 28.

As mentioned above, the ejection opening 30 for discharging the exposed instant film 6 is provided between the side plate 18 and top plate 12 of the case body 4 and, as described above, the ejection opening 30 is formed by providing a gap between a face of the top plate 12 of the case body 4 and the side plate 18, and the side plate 18 is formed by folding over and mutually superposing the peripheral edge portion 18*a* and the peripheral edge portion 18*b*. As a result, stiffness of portion peripheral to the ejection opening 30 is improved. Moreover, there is no need to provide a slit-like opening portion in the fold-out sheet 36 to form the ejection opening 30 in advance. Thus, the ejection opening 30 can be provided easily. A flap sheet, such as a paper product endowed with light-shielding ability, a laminated sheet of black polyethylene and paper, or the like, may be loosely sealed at the ejection opening 30 such that a portion thereof is peeled away by ejection of the instant film 6. If this flap sheet is provided, the ejection opening 30 can be maintained in a light-fast state and stiffness in the vicinity of the ejection opening 30 of the case body 4 can be further improved.

The light-shielding cover 8 is superposed over a stack of the instant films 6 and accommodated in the case body 4. The light-shielding cover 8 is a member formed of paper and covering the exposure opening 24 to block light. The light-shielding cover 8 protrudes slightly through the whole width of the ejection opening 30. Thus, the ejection opening 30 is covered and shielded from light by the light-shielding cover 8. In addition, when the ejection opening 30 is deformed, peripheral portions of the ejection opening 30 touch the light-shielding cover 8, and thus further deformation of the ejection opening 30 and the peripheral portions thereof is prevented. A protrusion amount of the light-shielding cover 8 from the ejection opening 30 is preferably 0.2 to 1.0 mm, and particularly preferably 0.4 to 0.8 mm.

Figure 5:
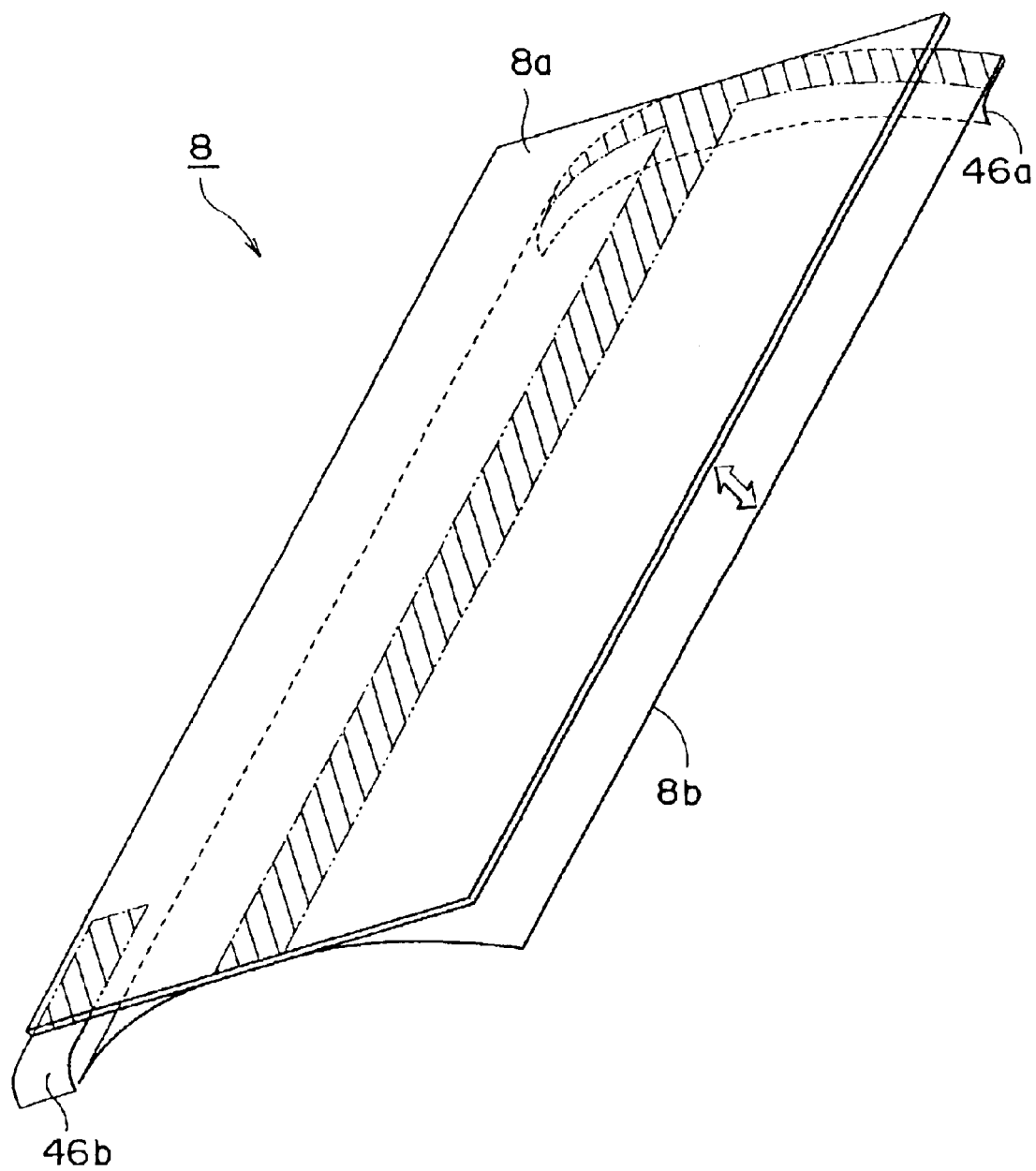
FIG. 5 is a perspective view showing a light-shielding cover of the instant photographic film pack illustrated in FIG. 1.

As shown in FIG. 5, the light-shielding cover 8 is structured by a base sheet 8*a*, which is formed of the same paper-related material as the fold-out sheet 36, and an auxiliary sheet 8*b*, which is provided at a side of the base sheet 8*a* at which the instant film 6 is disposed. The auxiliary sheet 8*b* is substantially the same shape as the base sheet 8*a*, and is adhered to the base sheet 8*a* at a central portion thereof.

The auxiliary sheet 8*b* has a function of filling a gap between the instant film 6 and the light-shielding cover 8 (the base sheet 8*a*) to improve light-shielding property of the light-shielding cover 8.

The auxiliary sheet 8*b* can be formed from the paper-related material. The auxiliary sheet 8*b* is preferably formed so that a peripheral portion thereof deforms in a direction towards the base sheet 8*a* when the light-shielding cover 8 is disposed in the case body 4. Thus, the auxiliary sheet 8*b* is preferably formed of a softer material than the material of which the base sheet 8a is formed, or formed to be thinner than the base sheet 8a.

Instead of being adhered to the surface of the base sheet 8a facing the instant films 6, the auxiliary sheet 8b can be provided on a surface of the base sheet 8a facing the exposure opening 24 of the case body 4. In the light-shielding cover 8 wherein the auxiliary sheet 8b is attached to the surface of the base sheet 8a facing the exposure opening 24, the auxiliary sheet 8b functions to fill a gap between the top plate 12 of the case body 4 and the light-shielding cover 8 (the base sheet 8a) to improve the light-shielding property thereof.

The auxiliary sheet 8b constituted in a single member as well as two or more members. Further, shapes and disposition locations of the auxiliary sheet 8b are not limited to the examples described above.

A shading sheet 46a, which covers the ejection opening 30 from inside of the case body 4 and blocks light, is stuck on an end portion of the light-shielding cover 8. The shading sheet 46a may be formed of a black polyethylene sheet having a thickness of 30 μm or other. A shading sheet 46b, which covers the insertion aperture 32 from inside of the case body 4 and blocks light, is stuck on the other end portion of the light-shielding cover 8. In the present embodiment, the shading sheet 46b is attached to the base sheet 8a of the light-shielding cover 8, and the shading sheet 46a is attached to the auxiliary sheet 8b of the light-shielding cover 8. In FIG. 5, oblique line-marked portion shows portions at which base sheet 8a is adhered to the auxiliary sheet 8b and the shading sheet 46b and at which the auxiliary sheet 8b is adhered to the shading sheet 46a.

Figure 6:
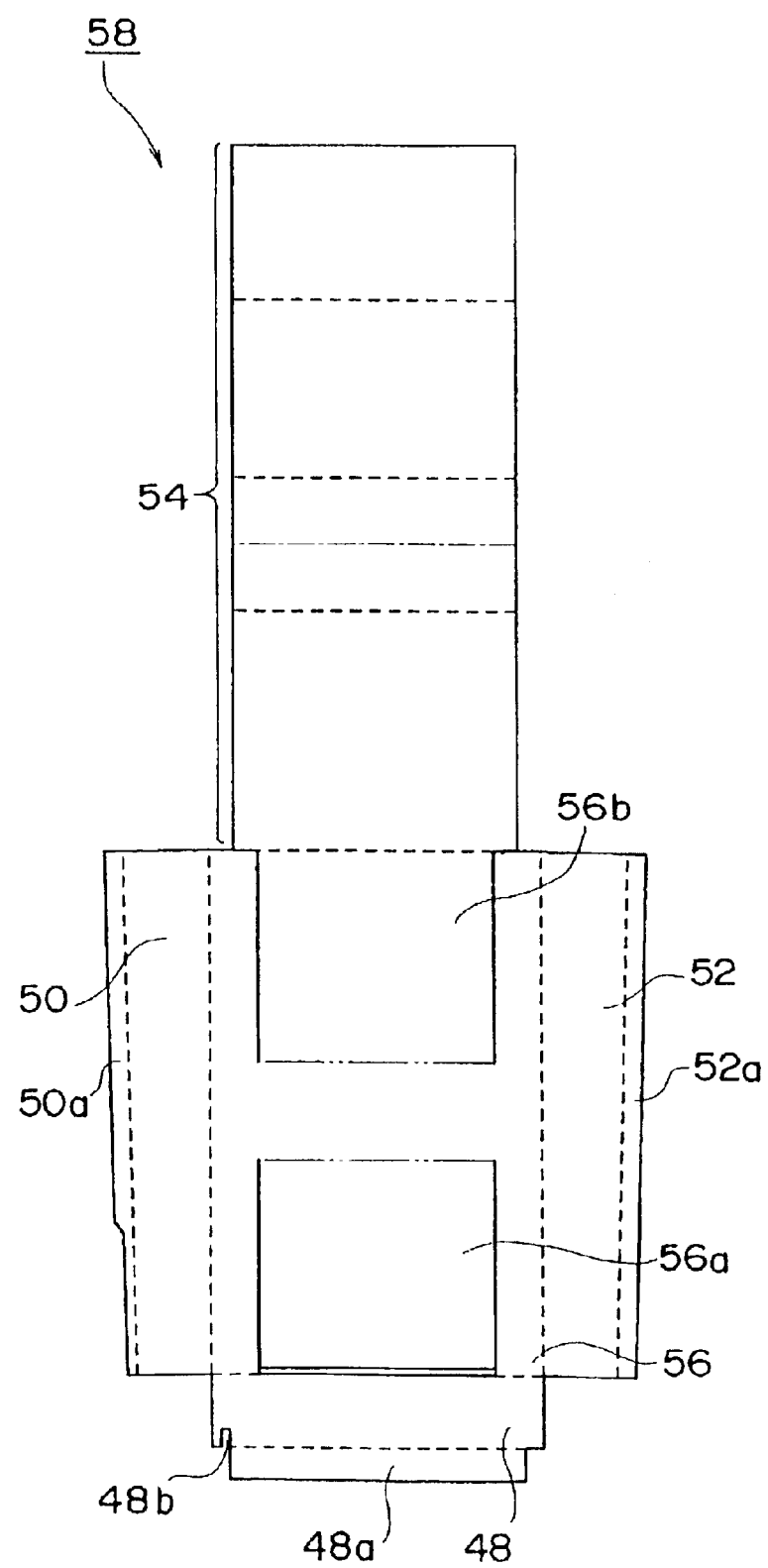
FIG. 6 is a development of an inner box for self-developing type film units of the present invention, the inner box relating to the first embodiment.

As shown in FIGS. 2 and 6, the inner box 10 is constituted of side portions 48, 50 and 52, a pressing piece 54, and a bottom portion 56. The side portions 48, 50 and 52 are interposed between the stacked instant films 6 and the side plates 16, 20 and 22 at the side faces of the case body 4. The pressing piece 54 pushes the instant films 6 toward the exposure opening 24. A folding piece 56a and a folding piece 56b are provided at the bottom portion 56. The folding piece 56b is extended to the pressing piece 54, and the folding piece 56a opposes the folding piece 56b with a central portion of the bottom portion 56 located therebetween. The folding piece 56a is formed by partitioning the bottom portion 56 by providing a pair of cuts that run parallel to the side portions 50 and 52 from the edge of the bottom portion 56 adjacent to the side member 48 to a central portion thereof and a folding line located at the central part of the bottom portion 56 so as to connect the two cuts perpendicularly at their ends. The folding piece 56b is also formed by partitioning the bottom portion 56 by providing a pair of cuts that run parallel to the side portions 50 and 52 from the edge of the bottom portion 56 adjacent to the pressing piece 54 to a central portion thereof and a folding line located at the central part of the bottom portion 56b and parallel to the folding line forming the folding piece 56a.

Thus, the inner box 10 is constituted of the side portions 48, 50 and 52, which are interposed between the side edges of the stacked instant films 6 and the side plates 16, 20 and 22 of the case body 4, the pressing piece 54, which pushes the instant films 6 toward the exposure opening 24, and the bottom portion 56, which integrally connects the side portions 48, 50 and 52 with the pressing piece 54.

As shown in FIG. 6, the inner box 10 is formed by folding a fold-out sheet 58 at folding lines shown in broken lines to the interior side of the case body 4 and folding to the exterior side thereof at folding lines shown in double dotted chain line.

For example, first, the portions of folding sheet 58 corresponding to the side portions 48, 50 and 52 are folded so as to stand up from three edges of the bottom portion 56 to form the side portions 48, 50 and 52.

Then, the pressing piece 54 is folded up from an edge of the bottom portion 56, and then, the pressing piece 54 is formed into ridges and a trough, and an end portion of the pressing piece 54 is abutted against the bottom portion 56.

Thus, the inner box 10 is formed from a single paper sheet, which is provided in advance with incisions and the like if necessary. Therefore, the number of steps of production procedure can be reduced as well as the costs for production can be also reduced.

A cutaway 48b for insertion of the pushing-out member is formed in the side portion 48 of the inner box 10. The cutaway 48b is formed, for example, by providing an incision or the like at a portion of the side portion 48.

Folding portions 48a, 50a and 52a, which are folded so as to be substantially parallel to the top plate 12 of the case body 4, are provided at edge portions of the side portions 48, 50 and 52, respectively, of the inner box 10. When the inner box 10 is accommodated in the case body 4, the folding pieces 48a, 50a and 52a abut against an inner side face of the light-shielding cover 8. Consequently, subsidence of the light-shielding cover 8 is prevented and thus, not only light from the exposure opening 24 is more effectively shielded but also deformation of the case body 4 is prevented.

The pressing piece 54 of the inner box 10 is provided so as to press a central portion of the instant films 6. Furthermore, the incisions at the bottom portion 56 forming the folding pieces 56a and 56b are formed so that the pressing piece 54 presses the instant films 6 toward the exposure opening 24 and both end portions of the pressing piece 54 press both end portions of the instant films 6 when the pusher members 72 are inserted. The folding pieces 56a and 56b are provided so as to be folded to the inner side at a vicinity of the central portion of the bottom portion 56 when the pusher members 72 are inserted. Thus, when the pusher members 72 are inserted through the insertion apertures 26, the folding pieces 56a and 56b fold up, and the pusher members 72 push up the both ends of the pressing piece 54, via the folding pieces 56a and 56b. Thus, the both ends of the instant films 6 are pushed up. Consequently, even when the instant films 6 are ejected and only a small number of instant films 6 are remaining in the case body 4, the instant films 6 are still pressed toward the exposure opening 24 in an appropriate force.

As mentioned above, since the inner box 10 is accommodated in the case body 4 so that the side portions 48, 50 and 52 are interposed between the side plates 16, 20 and 22 of the case body 4 and the side edges of the stacked instant films 6, direct contact of the side edges of the instant films 6 with protruding portions such as the folding portions 38a on the interior of the case body 4 can be effectively prevented. Moreover, the instant films 6 are properly positioned in the case body 4.

Additionally, the instant films 6 are pressed toward the exposure opening 24 by the pressing piece 54 in the inner box 10, and thus, formation of a gap between the instant films 6 or light-shielding cover 8 and the top plate 12 of the case body 4 having the exposure opening 24 is prevented. Thus, excellent light-shielding ability is endowed to the instant photographic film pack 2.

Furthermore, a stack of the instant films 6 can be accommodated in the case body 4 without coming apart since the stack is loaded into the case body 4 in such a manner that each instant film 6 is located in an appropriate position by the side portions 48, 50 and 52 of the inner box 10.

The case body 4, light-shielding cover 8 and inner box 10 of the instant photographic film pack 2 are formed of a paper-related material as described above, i.e., the instant photographic film pack 2 is constituted of members formed of the paper-related material that is mainly prepared from wood. Therefore, the instant photographic film pack 2 can be recycled without giving any major environmental impact.

The instant photographic film pack 2 is commonly packed in a wrapping bag and shipped. The instant photographic film pack 2 is unpacked and loaded into the pack-loading chamber 60 of the instant camera 1000 to be used.

Figure 7:
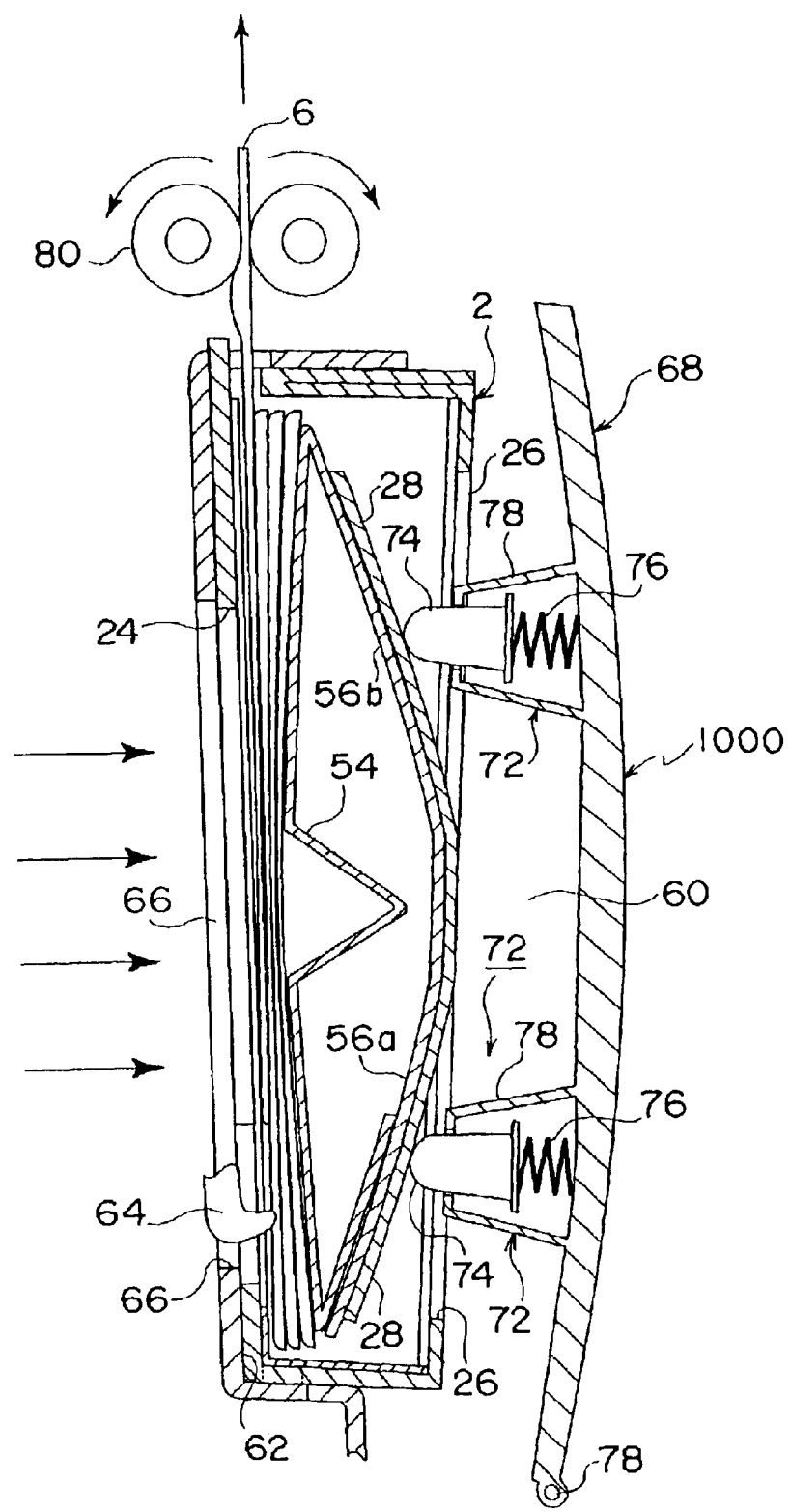
FIG. 7 is a sectional view showing a state in which the instant photographic film pack illustrated in FIG. 1 is loaded to an instant camera.

As shown in FIG. 7, when the instant photographic film pack 2 is loaded into the pack-loading chamber 60, a front face of the case body 4 wherein the exposure opening 24 is formed abuts against a receiving surface 62 to locate the instant photographic film pack 2 in an appropriate position.

An aperture opening 66, which demarcates a range of exposure onto the instant film 6, is formed in the receiving surface 62 of the pack-loading chamber 60 at a position facing the exposure opening 24 of the instant photographic film pack 2 which has been loaded. The hook-like member 64, which structures a well-known claw mechanism which serves as the pushing-out member, enters the insertion aperture 32 of the case body 4. The hook-like member 64 rakes the light-shielding cover 8 or instant film 6 out from the case body 4 by hooking on and lifting up a trailing end thereof.

A pack-loading lid 68 for closing the pack-loading chamber 60 is formed to be freely rotatable around a hinge portion 78. The pusher members 72, which are inserted into the insertion apertures 26 of the instant photographic film pack 2 and press the instant films 6, are provided at an inner face of the pack-loading lid 68. Each of the pusher members 72 is constituted of a pushing projection 74, a spring 76 and a retention frame 78. Each of the pushing projection 74 is inserted into the instant photographic film pack 2 through the insertion apertures 26 and the folding pieces 56a and 56b are folded toward the instant films 6. The spring 76 urges the pushing projection 74, and the retention frame 78 retains the pushing projection 74 and the spring 76.

Spreading rollers 80 are provided at an upper side of the pack-loading chamber 60. After exposure of the instant film 6, the instant film 6 is raked out from the case body 4 by the hook-like member 64 and conveyed toward a discharging aperture of the instant camera 1000 while the developer pod is squeezed by the spreading rollers 80. Development processing fluid that has flowed out from the developer pod is spread between the photosensitive sheet and an image-receiving sheet, and a predetermined developing and fixing process is carried out.

Next, it will be described how the instant photographic film pack 2 operates when it is set in the instant camera 1000.

The pack-loading lid 68 is opened, and the instant photographic film pack 2 is set in the pack-loading chamber 60 in an orientation such that the exposure opening 24 faces the receiving surface 62. When the pack-loading lid 68 is closed after setting the instant photographic film pack 2, the pushing projections 74 advance through the insertion apertures 26 to the interior of the instant photographic film pack 2, and press the folding pieces 56a and 56b toward the instant films 6. When the folding pieces 56a and 56b are pressed toward the instant films 6, the pressing piece 54 presses a central portion of the instant films 6 at a central portion thereof. The pressing piece 54 at the end portions thereof flexed by the pushing projections 74 presses end portions of the instant film 6.

When the pack-loading lid 68 is closed, an action for ejecting the light-shielding cover 8 is carried out. The hook-like member 64 enters through the insertion aperture 32, engages with one end of the light-shielding cover 8, and rakes the light-shielding cover 8 out toward the ejection opening 30. Consequent to extraction of the light-shielding cover 8, the exposure surface 44 of the instant film 6 faces the exposure opening 24 and preparation for exposure is complete. Because the instant films 6 are pressed against the exposure opening 24 from a rear face thereof by the pressing piece 54, an exposure range of the foremost instant film 6 facing the aperture opening 66 is demarcated by an exposure range of the aperture opening 66.

When exposure onto the foremost instant film 6 has been carried out, ejection processing is carried out in the same way as the action of ejecting the light-shielding cover 8. The hook-like member 64 engages with a trailing end of the instant film 6 that has been exposed, and ejects that instant film 6 through the ejection opening 30. When the pod portion 40 of that instant film 6 is passing between the spreading rollers 80, the developer pod is squeezed and a process of spreading the development processing fluid is carried out, and the hook-like member 64 is withdrawn.

Thereafter, the spreading process of the development processing fluid proceeds, and at the same time the instant film 6 is conveyed out of the instant camera 1000.

When the exposed instant film 6 has been completely ejected through the ejection opening 30, the next instant film 6 in line is made to face the exposure opening 24 by the pusher members 72, and preparation for the next photograph is completed. Meanwhile, at the exposed instant film 6 that has been conveyed out of the camera, a positive image is transferred when a predetermined development and fixing period has passed, and is utilized as a desired print photograph.

In this manner, photographs are taken one after another, and eventually all the instant films 6 will have been used up. Subsequently, the pack-loading lid 68 is opened and the now empty case body 4 is taken out. The case body 4 that has been taken out can be disposed as combustible rubbish, or can be retrieved and recycled.

A Second Embodiment

Another example of the instant photographic film pack is described in the following.

As shown in FIGS. 8 to 11, an instant photographic film pack 100 related to the second embodiment comprises a case body 102 accommodating instant films 200 that is an example of the self-developing type film unit in a stacked manner and a covering portion 104 covering an open side of the case body 102 to form a box with the case body 102.

The case body 102 is formed by injection-moulding of a paper-resin mentioned below and has an exposure side face 102a, a pair of end faces 102b and 102c, and a pair of side faces 102d and 102e. The end faces 102b and 102c are bordering the exposure side face 102a along the shorter side thereof. On the other side, the side faces 102d and 102e are bordering the exposure side face 102a along the longer sides thereof. Thus, the case body 102 has a shape like a tray having the bottom facing the exposure side face 102a opened.

An exposure opening 102A, from which an exposure face of the instant film 200 is exposed, opens in the exposure side face 102a opposite to the open side of the case body 102.

Figure 11:
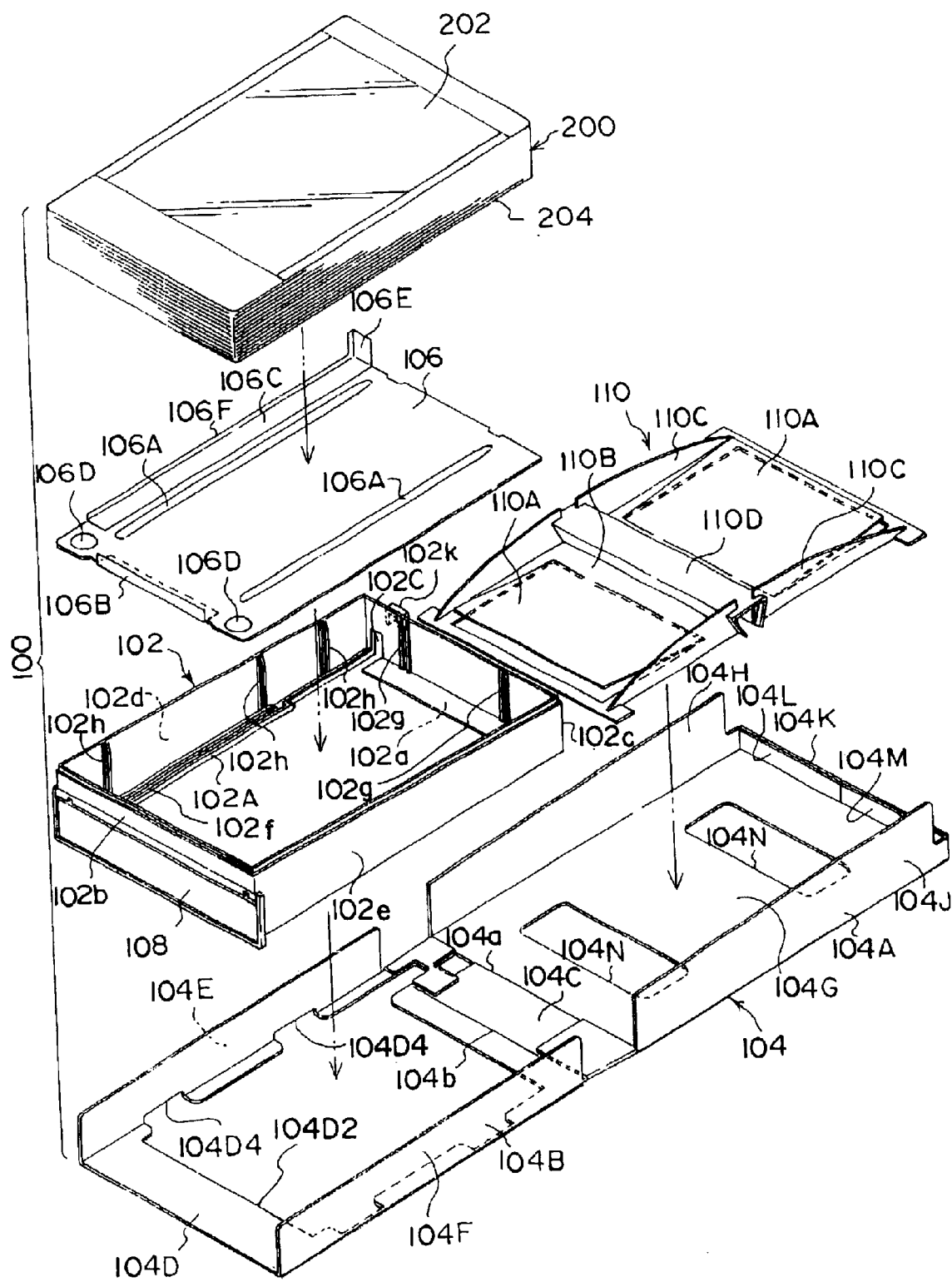
FIG. 11 is an exploded view of the instant photographic film pack of the second embodiment showing the inner construction thereof.

As shown in FIG. 11, on the exposure side face 102a, a rib 102f is formed along the edge of the exposure opening 102A so as to extend toward inside of the case body 102. Additionally, on the inner surfaces of the end face 102c, and side faces 102d and 102e, ribs 102g and 102h extending in the thickness direction of the case body 102 are formed respectively. When the instant photographic film pack 100 is loaded in an instant camera 300, the exposure side face 102a, end faces 102b and 102c, and the side faces 102d and 102e function as reference surfaces that is a reference for locating the case body 102. The ribs 102f, 102g and 102h give an improved rigidity to these faces. Thus, the instant photographic film pack 100 can be located in the instant camera 300 in a high accuracy.

An ejection slit 102B is formed on the end face 102b that has a larger height among the end faces 102b and 102c of the case body 102 in such a way that the ejection slit 102B extends along the edge bordering the end face 102b and the exposure side face 102a. The ejection slit 102B is a slit through which a light-shielding cover 106 and exposed instant films 200 are discharged. The ejection slit 102B is formed parallel to the direction in which the instant films 200 are stacked.

A second insertion opening 102C is formed on the end face 102c that is opposite to the end face 102b and has a smaller height than the end face 102b. The second insertion opening 102C is formed so as to extend to the exposure opening 102A.

As shown in FIG. 11, the instant films 200 is stacked and accommodated in the case body 102 with each of exposure surface 204 that is located on an opposite side from an image-forming surface 202 facing toward the exposure opening 102A.

As shown in FIG. 11, as a specific number of the instant films 200 are stacked and accommodated in the case body 102, the exposure surface 204 of the top instant film 200 faces the inner surface of the light-shielding cover 106 since the exposure opening 102A is covered by the light-shielding cover 106.

A light-shielding flap 108 covering the ejection slit 102B from outside is disposed on the end face 102b. The light-shielding flap 108 extends along the ejection slit 102B and bonded to the case body 102 at an area 108a as shown in FIG. 8 as a hatched area enclosed in broken lines.

The second insertion opening 102C is covered by a second light-shielding flap 106C attached to the light-shielding cover 106.

Figure 8:
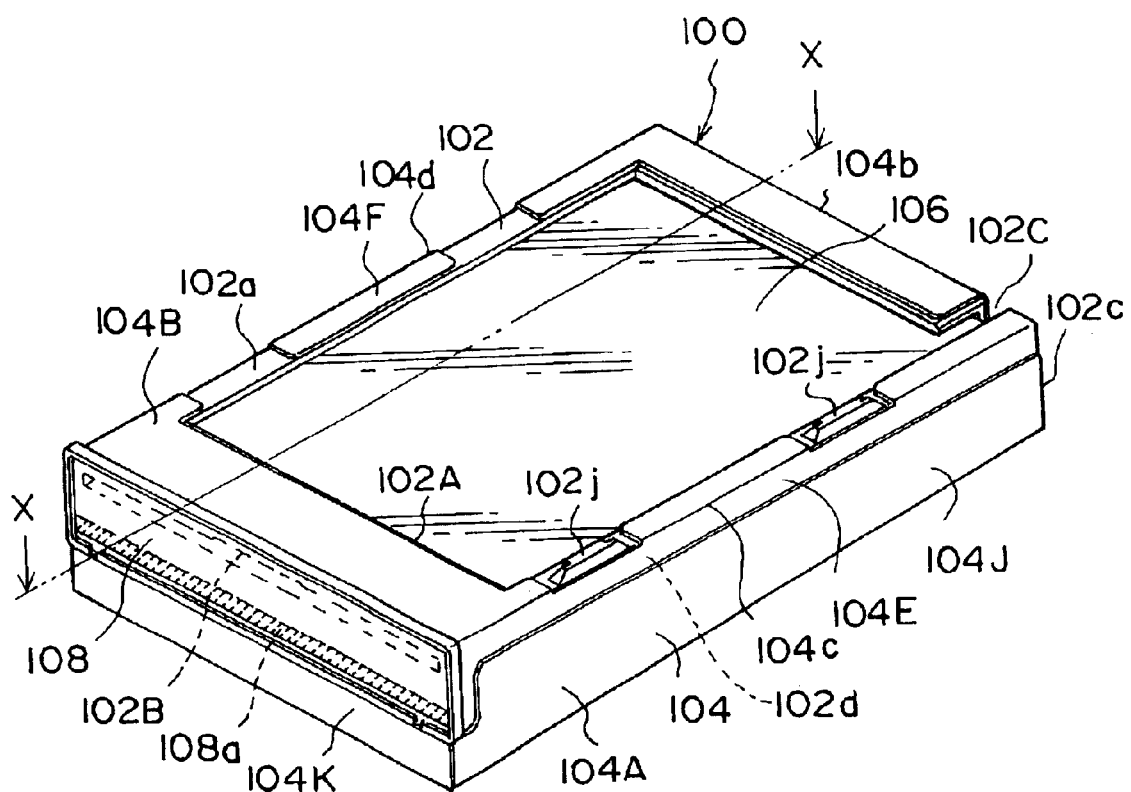
FIG. 8 is a perspective view of an instant photographic film pack of a second embodiment seen from the side of an exposure opening.
Figure 9:
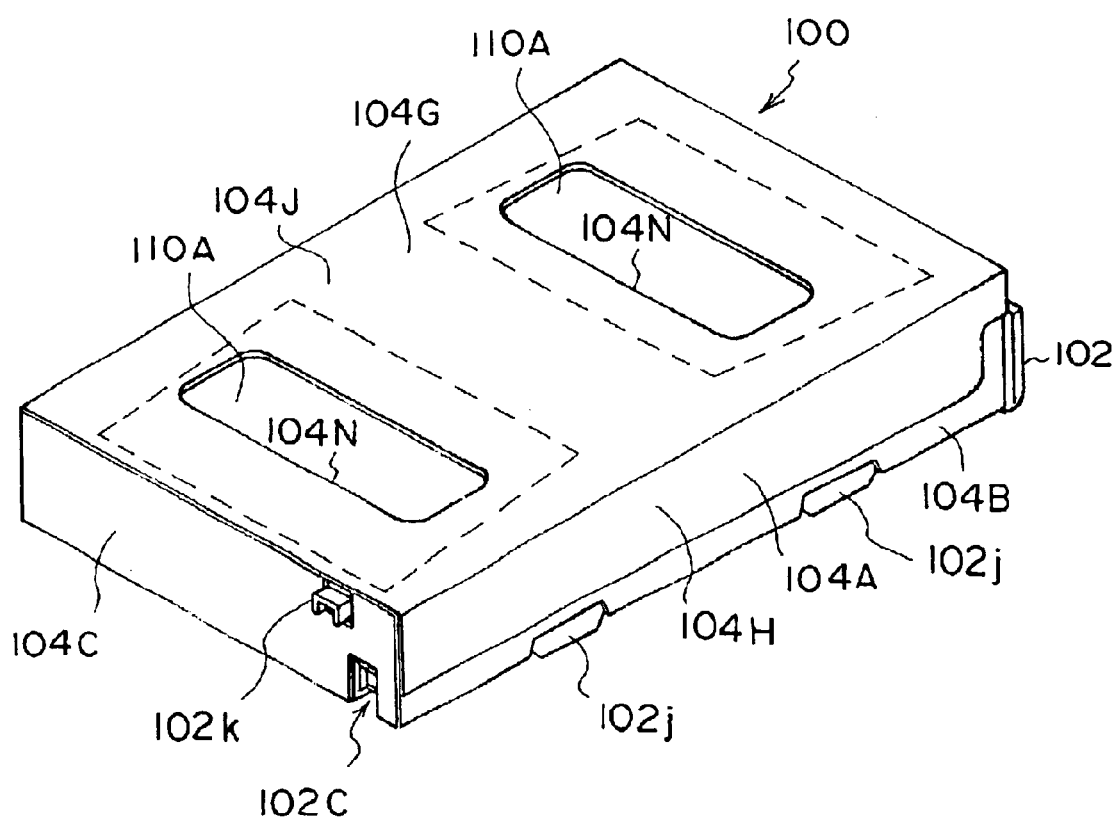
FIG. 9 is a perspective view of the instant photographic film pack of the second embodiment seen from the side of a first insertion opening.
Figure 10:
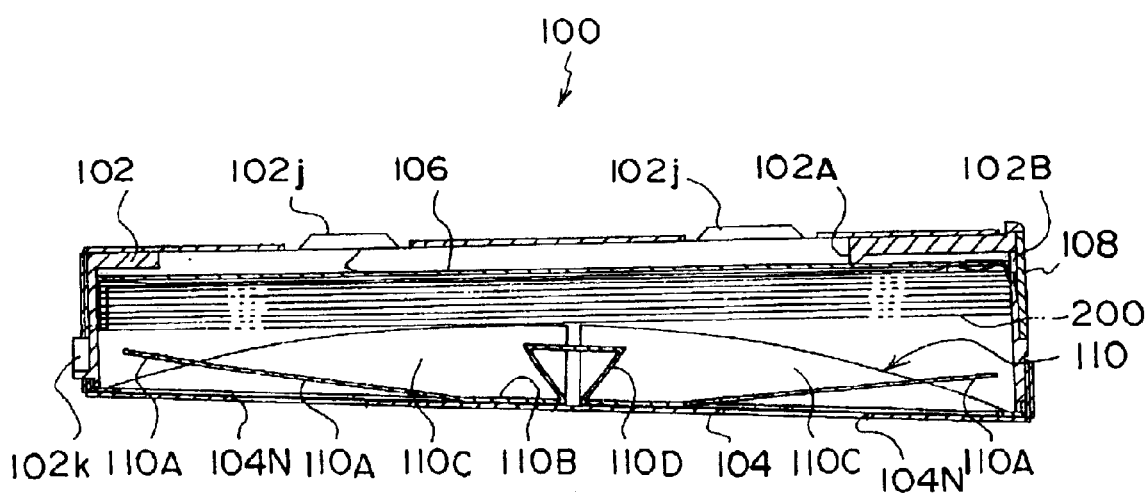
FIG. 10 is a sectional view of the instant photographic film pack of the second embodiment sectioned by the plane X—X in FIG. 8.
Figure 12:
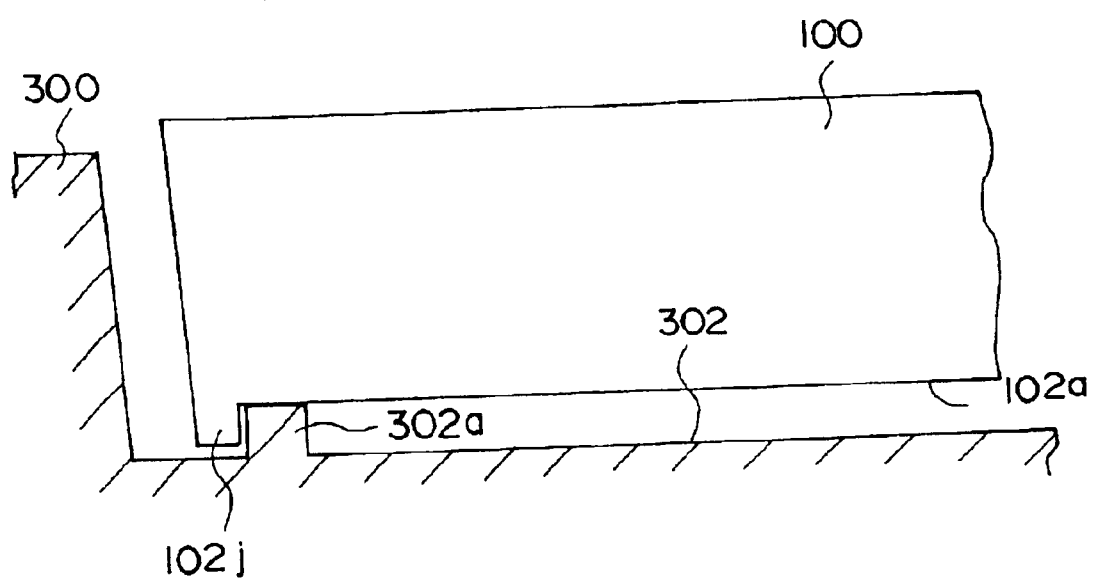
FIG. 12 is a brief sectional view showing an engagement of a locating rib of the instant photographic film pack of the second embodiment loaded in a pack chamber of an instant camera and a locating protrusion disposed on an inner wall of the pack chamber of the instant camera.
Figure 13:
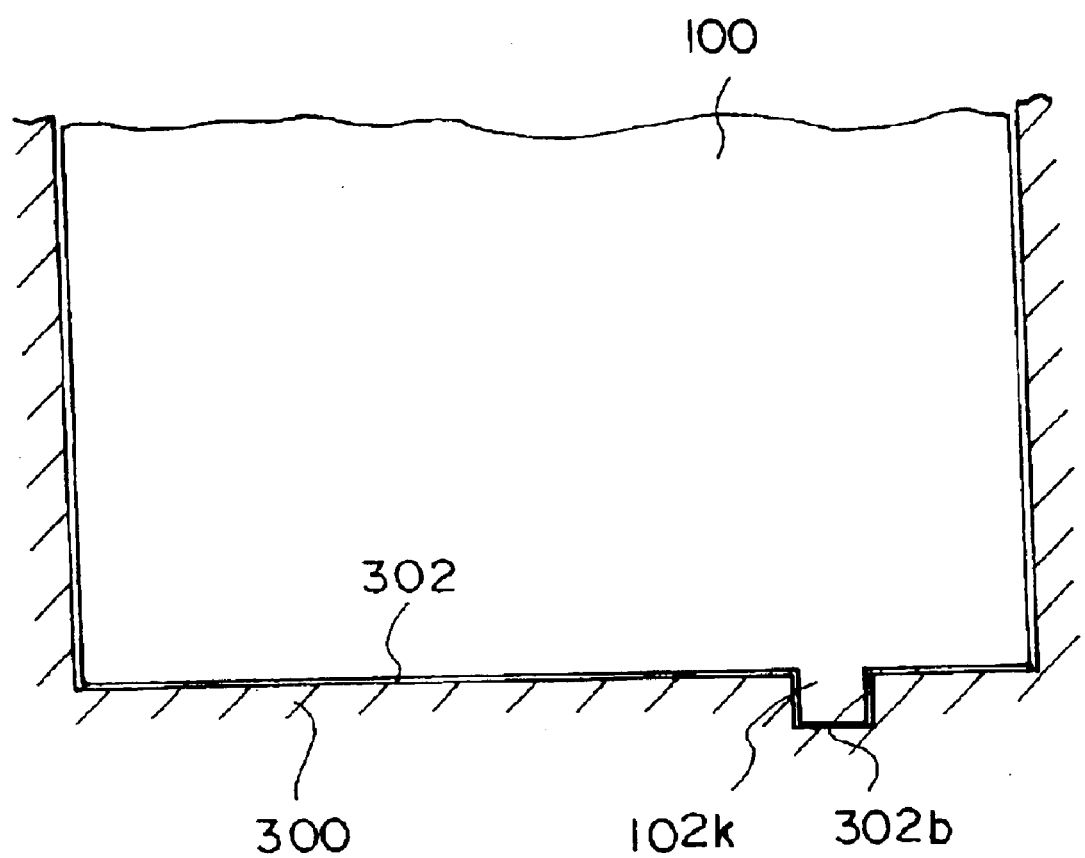
FIG. 13 is a brief sectional view showing an engagement of a locating protrusion of the instant photographic film pack of the second embodiment loaded in the pack chamber of the instant camera and a locating recess disposed on the inner wall of the pack chamber thereof.

As shown in FIGS. 8, 9, and 10, locating ribs 102j is formed at the top edge of the side face 102d as well as a locating protrusion 102k is formed at a portion of the side face 102c adjacent to the second insertion opening 102C. As shown in FIG. 12, the locating ribs 102j has a function of engaging with a locating protrusion 302a on a bottom of a pack chamber 302 to locate the instant photographic film pack 100 in its width direction when it is loaded to the instant camera 300. On the other hand, as shown in FIG. 13, the locating protrusion 102k has a function of engaging with a locating recess 302b in the pack chamber 302 to locate the instant photographic film pack 100 in a longitudinal direction thereof.

Figure 14:
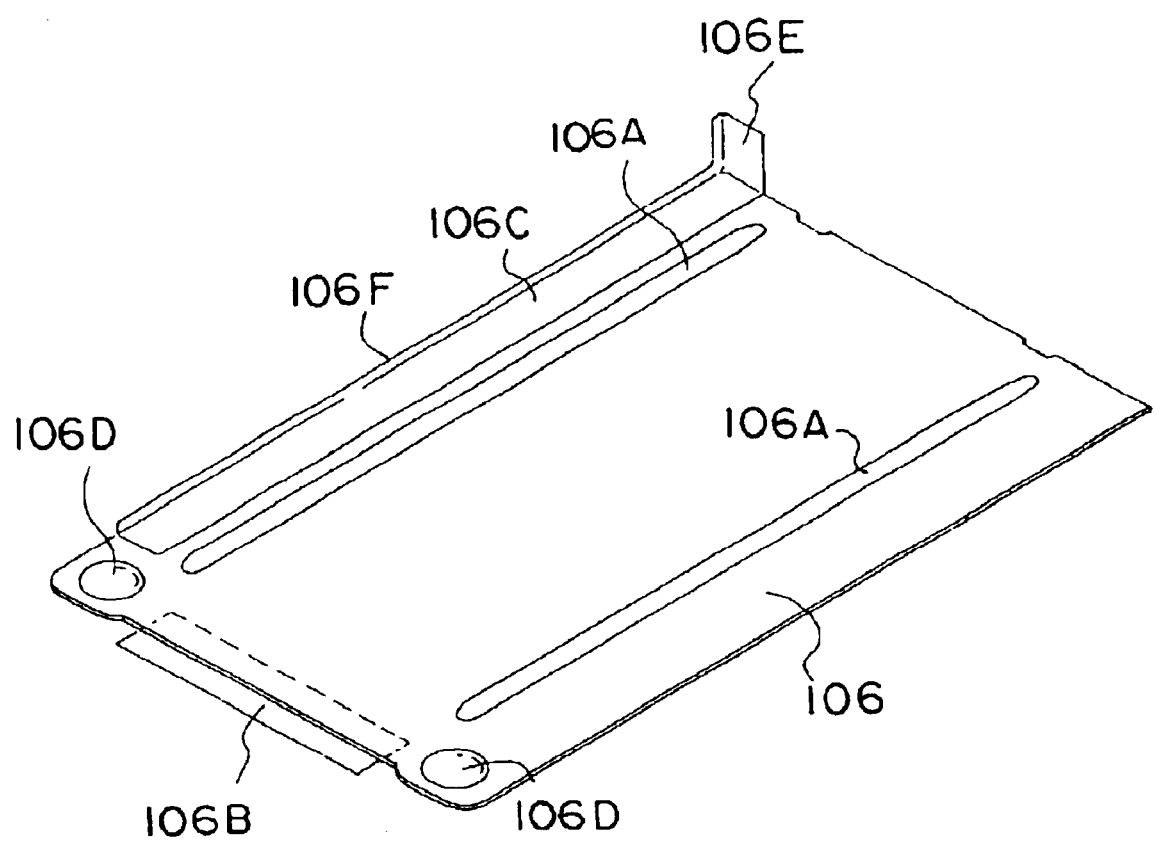
FIG. 14 is a perspective view of a light-shielding cover covering the exposure opening of the instant photographic film pack showing the side thereof facing inside of the instant photographic film pack when attached thereto.

The light-shielding cover 106 is formed of a black-coloured sheet of a cardboard or a paper-resin and has a shape of a rectangle having each corner rounded as shown in FIGS. 11 and 14. The light-shielding cover 106 also has a pair of reinforcing ribs 106A, a third light-shielding flap 106B, the second light-shielding flap 106C, and a pair of dimples 106D. The reinforcing ribs 106A extend along almost the entire length of the longer side of the light-shielding cover 106 and protrude on the face facing outside when the light-shielding flap 106 is fit in the case body 102. The third light-shielding flap 106B is attached along the shorter side of the light-shielding cover 106 and on the surface to which the reinforcing ribs 106A protrudes. The second light shielding flap 106C is attached along one of the longer side of the light-shielding cover on the face opposite to the face on which the reinforcing ribs 106A protrude. The dimples 106D protrude toward inside of the case body 102 and are formed so that the third light-shielding flap 106C is located between them.

The third light-shielding flap 106B is a folio-like piece formed of a black-coloured plastic film and bent inwardly when the light shield cover 106 is attached in the case body 102 to cover the ejection slit 102B from inside so as to prevent outside light from entering inside through the ejection opening 102B in co-operation with the light-shielding flap 108.

The second light-shielding flap 106C is also a folio-like piece formed of a black-coloured plastic film and attached to the surface of the light-shielding cover 106 facing inside along one of the longer side thereof. The second light-shielding flap 106C has a bent portion 106E bent in the right angle at the end opposed to the end thereof close to the dimples 106D and the third light shielding flap 106B. The outside edge portion of the second light-shielding flap 106C is bent perpendicularly to form a bent portion 106F. When the light shielding cover 106 is fit in the case body 102, the bent portion 106E of the second light-shielding flap 106C covers the second insertion opening 102C of case body 102 from inside as well as the bent portion 106F fits closely to the inner surface of the side face 102d to prevent entry of outside light through a gap between the light-shielding cover 106 and the exposure opening 102A.

As shown in FIGS. 8 to 11 and 15, the covering portion 104 consists of an open side-covering portion 104A covering the open side of the case body 102, a case body-covering portion 104B in which the case body 102 is wrapped around, and a connecting portion 104C connecting the open side-covering portion 104A and the case body-covering portion 104B as well as covering the end face 102c of the case body 102 from outside.

Figure 15:
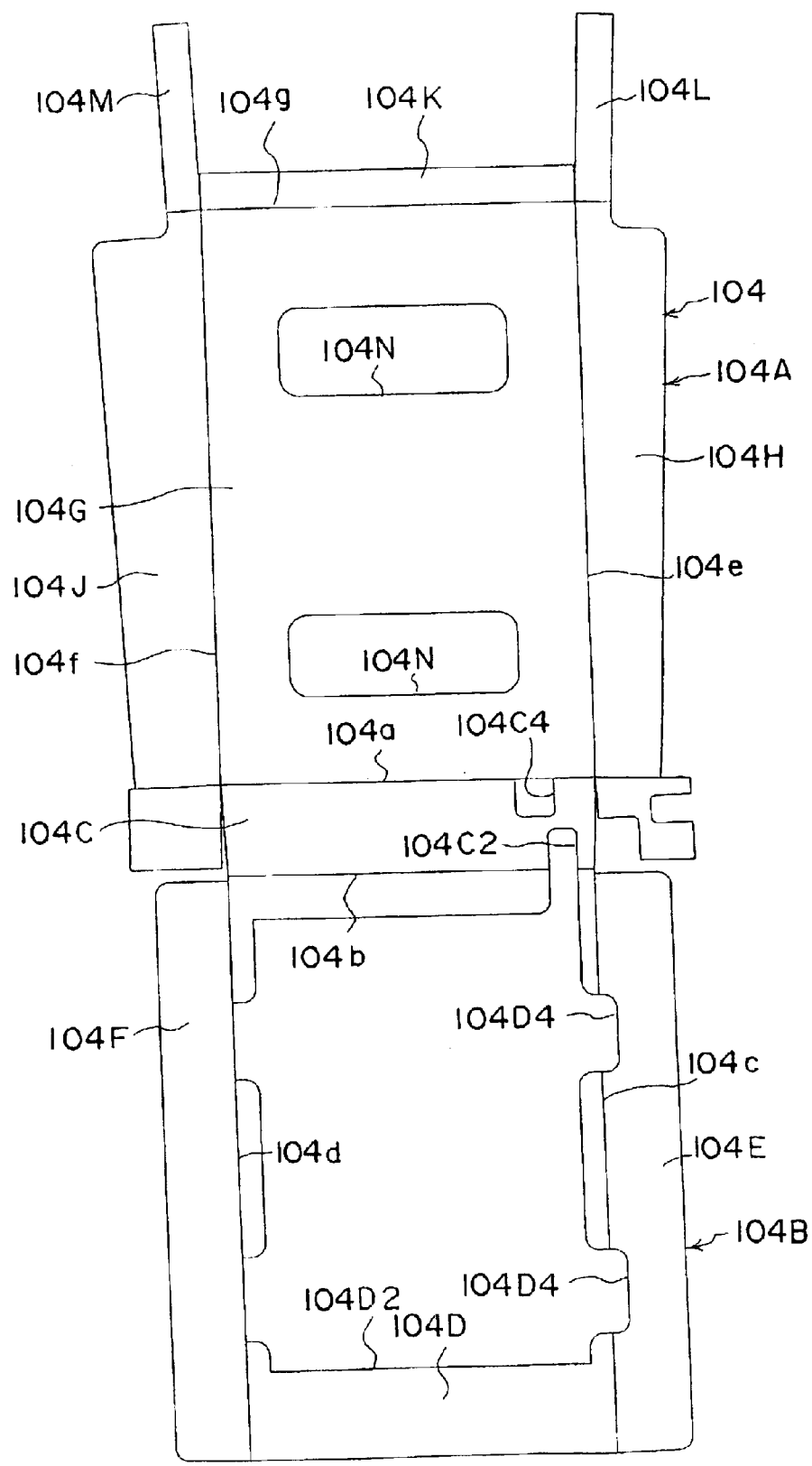
FIG. 15 is a development of a covering portion of the instant photographic film pack of the second embodiment.

A folding line 104a is formed between the open side-covering portion 104A and the connecting portion 104C, and a folding line 104b is formed between the connecting portion 104C and the case body-covering portion 104B. As shown in FIGS. 11 and 15, the covering portion 104 is folded at the folding lines 104a and 104b so that the open side-covering portion 104A and the case body-covering portion 104B face each other with the connecting portion 104C therebetween to cover the side faces 102d and 102e of the case body 102.

The case body-covering portion 104B comprises a exposure side face-covering portion 104D covering the exposure side face 102a of the case portion 102 and side face-covering portions 104E and 104F bordering the exposure side face-covering portion 104D and covering the side faces 102d and 102e of the case body 102.

The exposure side face-covering portion 104D has an opening 104D2 exposing the exposure opening 102A and the second insertion opening 102C. The opening 104D2 has notches 104D4 exposing locating ribs 102j.

The open side-covering portion 104A comprises a covering face-forming portion 104G, side face-forming portions 104H and 104J, and an end face portion 104K. The covering face-forming portion 104G covers the open side of the case body 102. The side face-forming portions 104H and 104J border the covering face-forming portion 104G at longer sides thereof. The end face portion 104K is formed so as to face the connecting portion 104C with the covering face-forming portion 104G therebetween. The end face portion 104K borders the covering face-forming portion 104G at shorter side edges thereof. Reinforcing flaps 104L and 104M border the side face-forming portions 104H and 104J at their sides adjacent to the end face portion 104K, respectively.

The covering portion 104 is formed by folding a one-piece sheet cut from a cardboard sheet in a shape shown in FIG. 15.

The case body-covering portion 104B is formed by folding the above-mentioned sheet along the folding lines 104c and 104d so that the side face-covering portions 104E and 104F are erected perpendicularly to the exposure side face-covering portion 104D toward the same side thereof.

The open side-covering portion 104A is formed by folding the portion of the above-mentioned cardboard sheet corresponding to the open side-covering portion 104A at the folding lines 104e, 104f, and 104g so that the side face-forming portions 104H and 104J, and end face portion 104K erected perpendicularly to the covering face-forming portion 104G, respectively. Then, the end face portion 104K is fixed to the side face-forming portions 104H and 104J by bonding the reinforcing flaps 104L and 104M to the inner surface of the end face portion 104K. Thus, the open side-covering portion 104A is formed to have a tray-like shape as a whole.

A pair of first insertion openings 104N are formed at a center of the covering face-forming portion 104G. A light-shielding member 110 is bonded to the inner surface of the covering face-forming portion 104G at a location where the first insertion openings 104N can be covered.

On the connecting portion 104C, a cut 104C2 extending to the opening 104D2 and exposing the second insertion opening 102C and an opening 104C4 exposing the locating protrusion 102k are formed.

It is preferable to colour the inside of the covering portion 104 in black or to provide a black-coloured layer in the wall of the covering portion 104 to prevent entry of light from the outside. In the present embodiment, a cardboard sheet is folded to form the covering portion 104. Instead of employing the cardboard sheet, a sheet formed by extruding a paper-resin can be used to form the covering portion 104.

Figure 16:
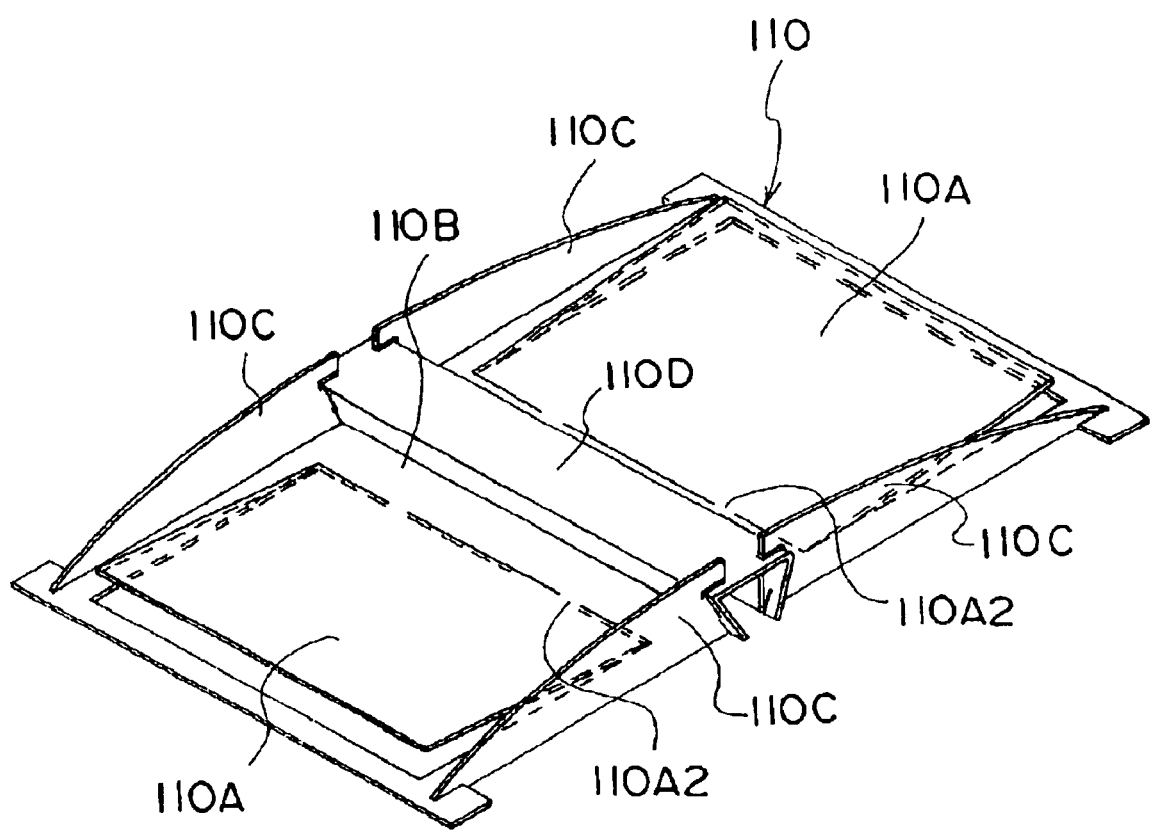
FIG. 16 is a perspective view showing a light-shielding member fixed inside of the covering portion of the instant photographic film pack of the second embodiment.

As shown in FIGS. 9 to 11 and 16, the light-shielding member 110 comprises a pair of first light-shielding flaps 110A and a base 110B. The light-shielding flaps 110A cover the first insertion openings 104N from inside to shield light from outside. The base 110B has a rectangular shape as a whole and is attached to the inner surface of the covering face-forming portion 104G so as to fix the light-shielding flaps 110A on the inner surface by a pair of hinge portions 110A2. The base 110B is folded at the longitudinal edge portions thereof in an upward direction as shown in FIGS. 11 and 16 to form a pair of ridge portions 110C having a crescent shape. The base 110B is also folded at the central portion thereof toward the upward direction that is the same direction as the direction of the ridge portions 110C and along the width direction thereof so as to form a reinforcing portion 110D having an Ω-shaped section. The ridge portions 110C as well as the reinforcing portion 110D serve to provide the light-shielding member 110 and the open side-covering portion 104A with rigidity when the light-shielding member 110 is bonded on the open side-covering portion 104A. The ridge portion 110C also serves to press the instant films 200 accommodated inside of the case body 102 toward the exposure opening 102A.

Figure 17:
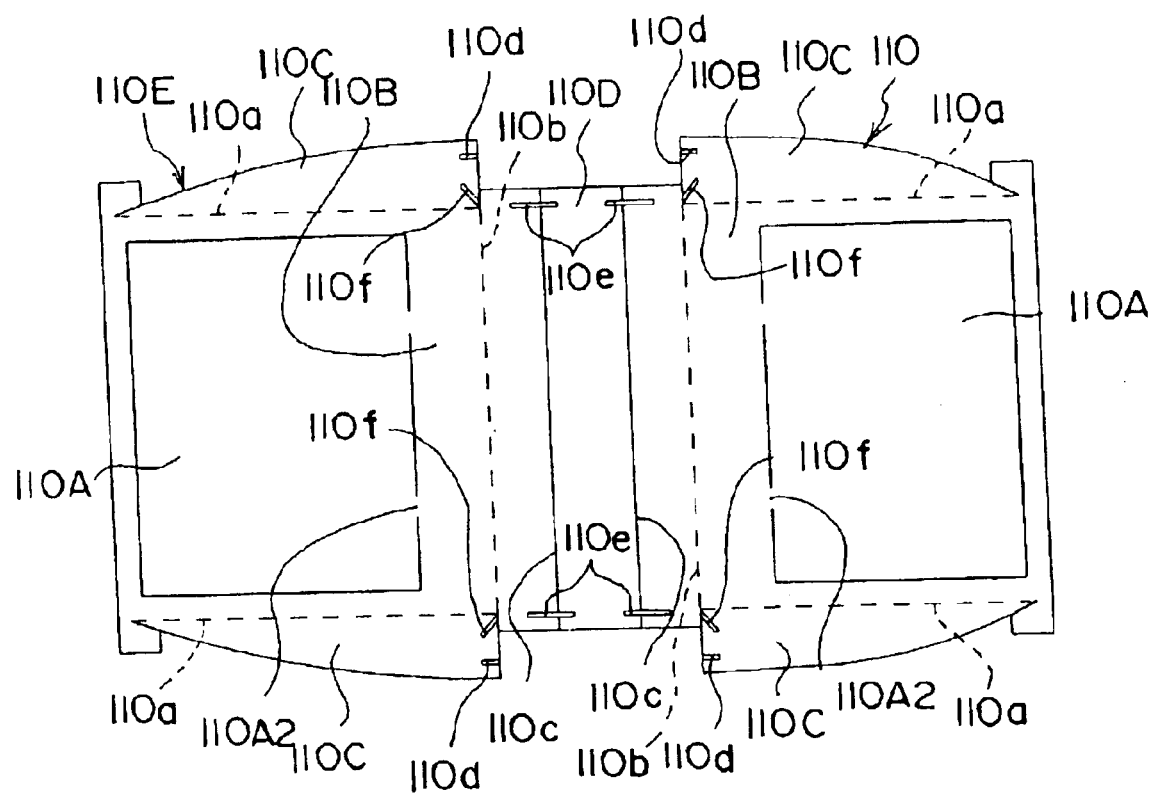
FIG. 17 is a development of the light-shielding member.

The light-shielding member 110 is formed by folding a black-coloured sheet 110E along folding lines 110a, 110b, and 110c. The black-coloured sheet 110E is a one-piece sheet cut from cardboard or a paper-resin sheet in a shape shown in FIG. 17. In FIG. 17, among the folding lines 110a, 110b, and 110c, the black-coloured sheet 110E is folded at the folding lines shown in a broken line so as to make a trough and folded at the folding lines shown in a solid line so as to make a ridge.

Steps for forming the light-shielding member 110 by folding the sheet 110E is described below:

first, folding the sheet 110E at the folding line 110a so as to erect the ridge portions 110C toward the same side of the base 110B perpendicularly thereto;

then, folding the sheet 110E at the folding lines 110b and 110c to erect the reinforcing portion 110D in the same direction as the erected ridge portions 110C;

and then, inter-locking the cuts 110d, 110e, and 110f to fix the ridge portions 110C and the reinforcing portion 110D to each other.

Figure 18:
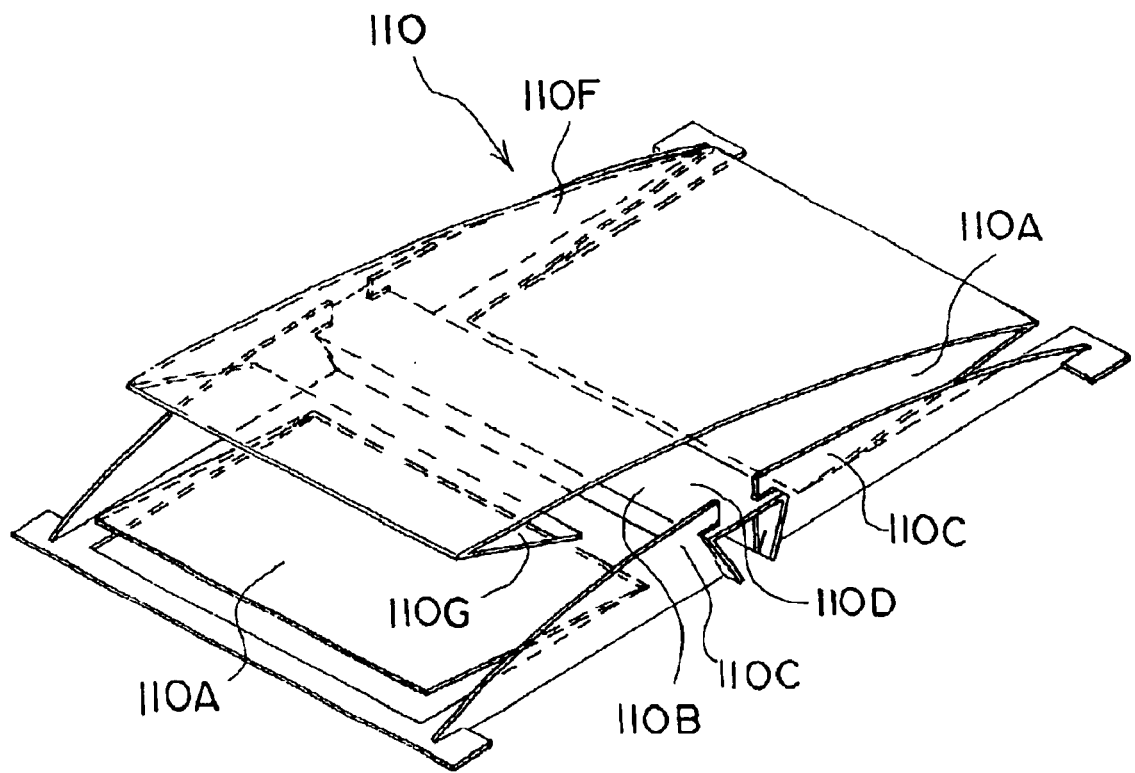
FIG. 18 is a perspective view of an another example of a light-shielding member that can be employed in the instant photographic film pack of the second embodiment.

Another example of the light-shielding member 110 is shown in FIG. 18. The light-shielding member 110 in FIG. 18 has a first portion of the first light-shielding flaps 110A extending toward a second portion of the first light-shielding flaps 110A so as to form an instant film-pressing portion 110F. At one end, the instant film-pressing portion 110F has an overlapping portion 110G overlapping over the second portion of the first light-shielding flaps 110A. When a pressing member 306 disposed in an instant camera 300 is inserted inside through the first insertion opening 104N of the covering portion 104 and press the first light-shielding flaps 110A, the instant film-pressing portion 110F moves toward the exposure opening 102A of the case body 102 to press the instant films 200 accommodated inside toward the exposure opening 102A.

The light-shielding member 110 shown in FIG. 18 is more preferable than the light-shielding member shown in FIGS. 16 and 17 in that the former can press the instant films more uniformly and the overlapping portion 110G thereof overlaps over the second portion of the first light-shielding flap 110A to prevent entry of light from outside more effectively.

The paper-resin employed to form the case body 102 can be prepared in the following procedure.

First, waste-developing paper is cut in a size of 0.5 to 2 mm square. Then, the waste developing paper cut in the above size is beaten into a cellulose fiber by an appropriate beating machine such as a pin-mill or a turbo-mill. The obtained cellulose fiber is pressed into pellets having a diameter of 2 to 3 mm and a length of 3 to 5 mm. Thus the pellets is kneaded with polypropylene resin pellets in a specific ratio, e.g., a ratio of paper pellet to polypropylene resin pellet of 51:49 to 75:25 (weight ratio) to prepare a kneaded mixture, and the kneaded mixture is extruded into a string and cut into pellets. The waste developing paper contains 20 weight-% of polyethylene and therefore, the amount of the cellulose fiber in the paper-resin is 41 to 60 weight-%.

PP (polypropylene) resin pellets are added to the thus prepared paper-resin pellets in a ratio of 5:5 (the paper-resin pellets to the PP resin pellets, weight ratio) to adjust the amount of the cellulose fiber in the paper-resin pellets into 21 to 30 weight-%. Then the case body 102 is injection-moulded of the paper-resin pellets.

The instant photographic film pack 100 can be assembled in the following procedure.

As shown in FIG. 11, the exposure side face 102a of the case body 102 is bonded to the exposure side face-covering portion 104D of the case body-covering portion 104B. Simultaneously, the side face-covering portions 104E and 104F are folded perpendicularly to the exposure side face-covering portion 104D so as to wrap around the side faces 102e and 102d, and bonded thereto.

On the other hand, the open side-covering portion 104A is folded into a tray and the light-shielding member 110 is bonded to the inner surface of the covering face-forming portion 104G.

Then, the light-shielding cover 106 is installed inside of the case body 102 from the open side thereof to cover the exposure opening 102A. The light-shielding cover 106 is installed so that the bent portion 106E of the second light-shielding flap 106C covers the second insertion opening 102C and the reinforcing ribs 106A protrudes toward outside.

After installing the light-shielding cover 106 in the case body 102, a stack of a specific number of the instant films 200 is loaded in the case body 102.

Then, the covering portion 104 is folded at the folding lines 104a and 104b so that the open side-covering portion 104A is overlapped over the case body-covering portion 104B. The side face-forming portions 104H and 104J are overlapped and bonded to the side face-covering portions 104E and 104F from outside, respectively.

Figure 19A:
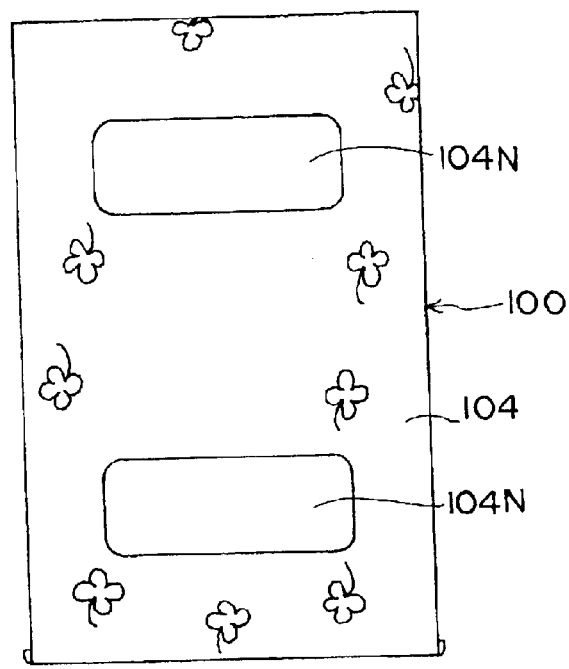
FIG. 19A is a plane view of an example of the instant photographic film pack of the second embodiment seen from the side of the covering portion, the example relating to an instant photographic film pack having a covering portion of which entire surface is covered with printed decoration.
Figure 19B:
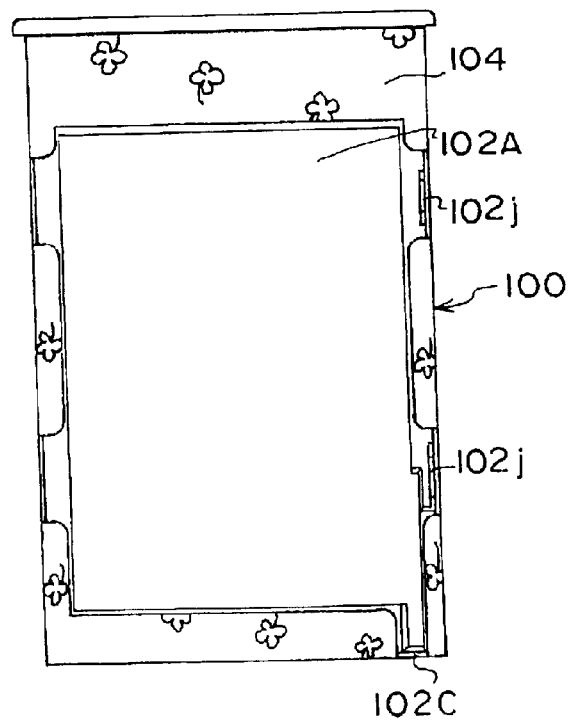
FIG. 19B is a plane view of the instant photographic film pack of FIG. 19A seen from the side of the case body thereof.
Figure 20:
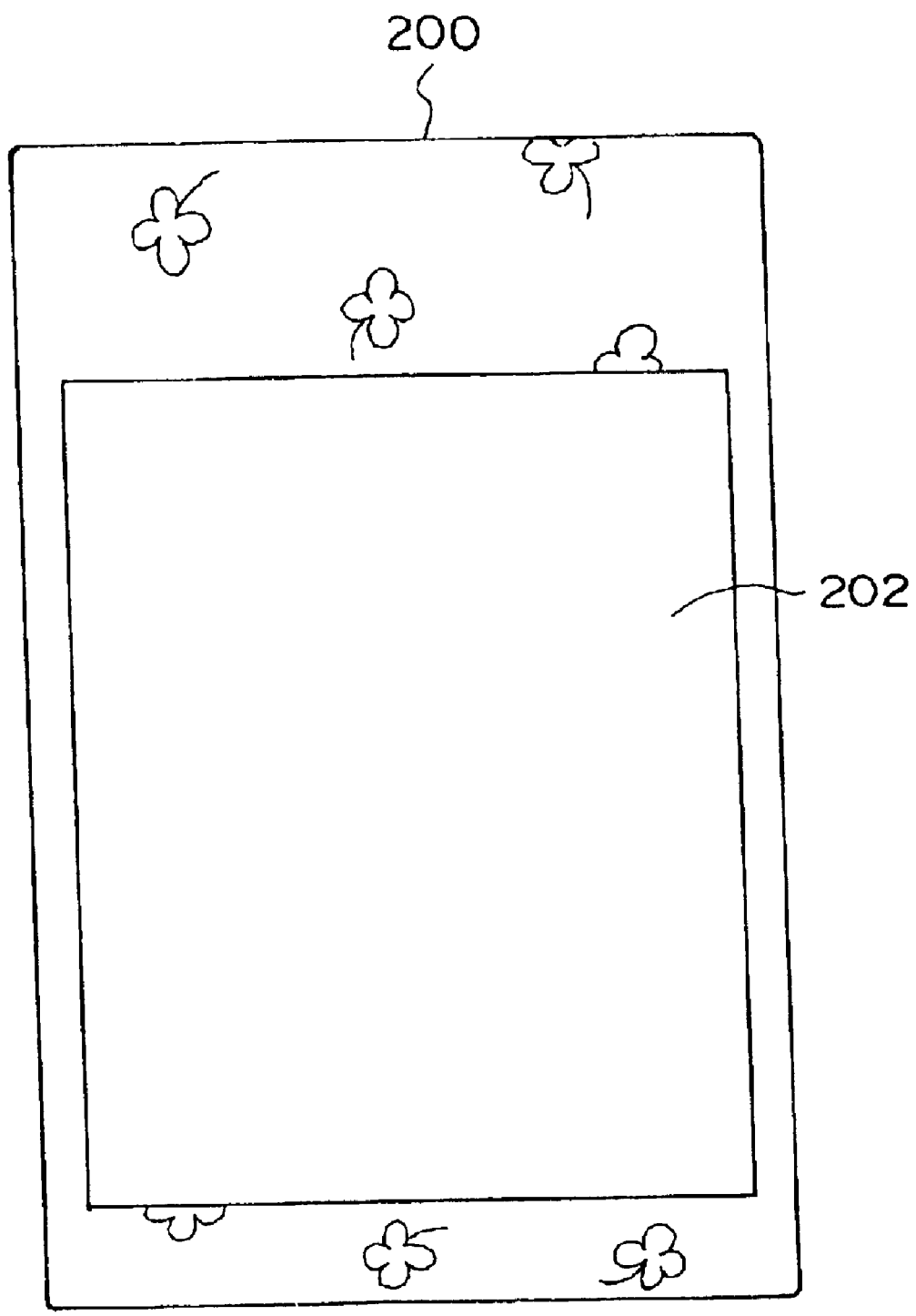
FIG. 20 is a plane view of an example of an instant photographic film pack accommodated inside the instant photographic film pack of the second embodiment wherein the same decoration shown in FIGS. 19A and 19B is applied to an area around an image-forming surface thereof.

As shown in FIGS. 19A and 19B, decoration that is composed of specific letters and/or figures can be printed on the entire surface of the covering portion 104 forming an exterior of the instant photographic film pack 100. Additionally, as shown in FIG. 20, not only on the covering portion 104 but also on an area around an image-forming surface 202 of the instant film 200, the same decoration can be printed.

Figure 21:
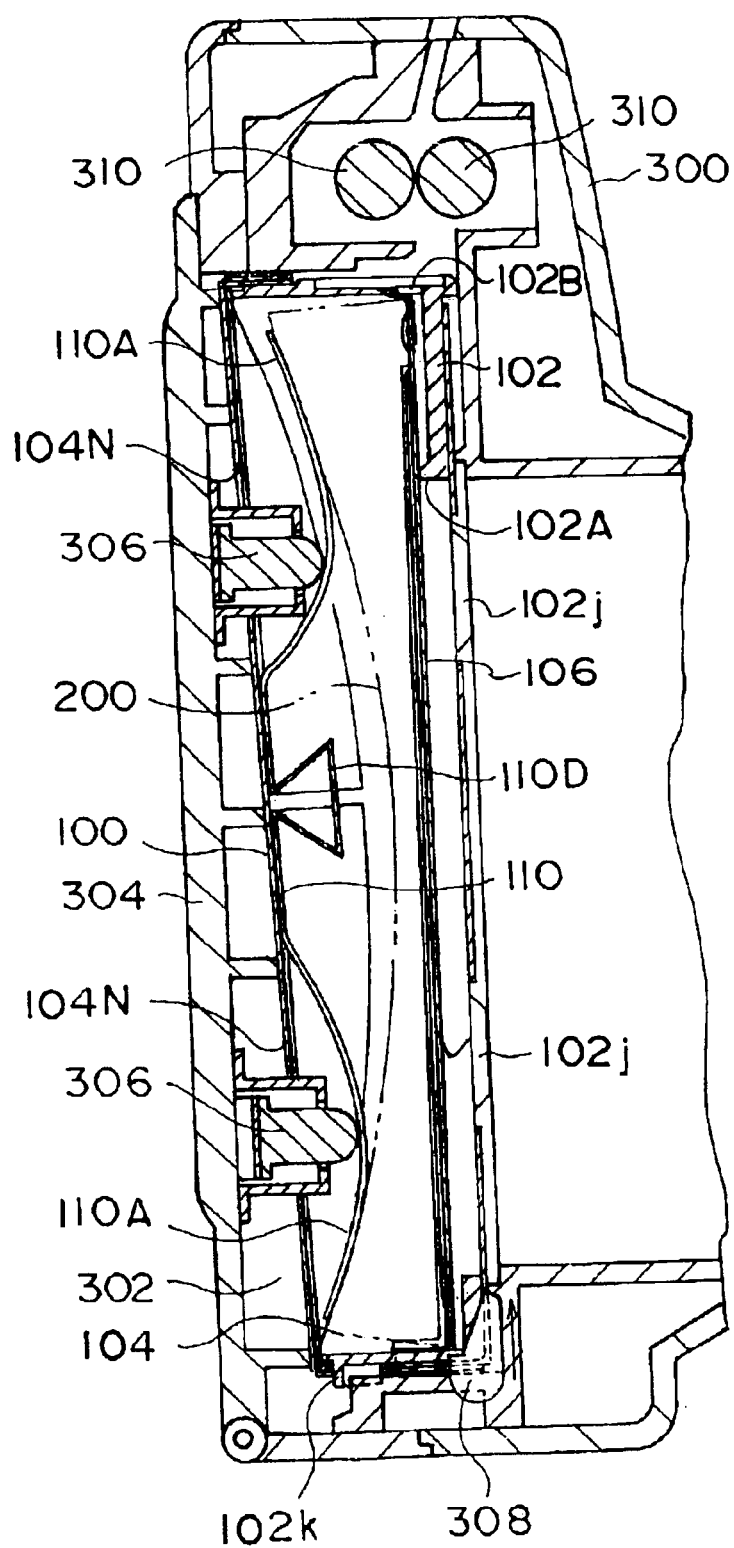
FIG. 21 is a sectional view showing the instant photographic film pack of the second embodiment loaded to an instant camera.

FIG. 21 shows the instant photographic film pack 100 loaded to the instant camera 300.

As shown in FIG. 21, when loading the instant photographic film pack 100 into the pack chamber 302 of the instant camera 300 and closing a backside lid 304, the instant photographic film pack 100 is located by the locating ribs 102j and the locating protrusion 102k at a specific location in the pack chamber 302. Simultaneously, the pressing member 306 protruding from the backside lid 304 into the pack chamber 302 is inserted into the case body 102 through the first insertion openings 104N to press the first light-shielding flaps 104A toward the light-shielding cover 106. Thus, the instant films 200 accommodated in case body 102 are pressed by the first light-shielding flaps 110A toward the light-shielding cover.

When starting photo-taking, a claw 308 resting at the bottom of the pack chamber 302 moves upward as shown by the arrow in FIG. 21 to enter the central part of the exposure opening 102A from the second insertion opening 102C of the instant photographic film pack 100 so as to push the light-shielding cover 106 upward. The light-shielding cover 106 moving upward by the claw 308 is discharged to the outside of the instant photographic film pack 100, and consequently, discharged to the outside of the instant camera 300 by a pair of discharging rollers 310 located in the above of the pack chamber 300. Thus, the exposure surface 204 of a first instant film 200 is exposed. After the light-shielding cover 106 is discharged out of the instant camera 300, the claw 308 returns to its resting position.

Then, a shutter (not shown in FIG. 21) of the instant camera 300 is released and the exposure surface 204 of the first instant film 200 is exposed to form a latent image thereon.

After exposing the exposure surface 204, the claw 308 in its resting position again moves upward to discharge the first instant film 200 out of the instant camera 300. While the instant film is passing between the discharging rollers 310, a small bag just above the exposure surface 204 is broken and a colour developing and fixing agent inside the bag permeates into the exposure surface 204. Thus, in the exposure surface 204, development, fixing, and coupling of the latent image proceed simultaneously and a positive image appears on the image-forming surface 202.

As mentioned in the above, the case body 102 is formed by injection moulding of a paper-resin and the covering portion 104 as well as the light-shielding member 110 is formed of a cardboard.

The paper-resin used for forming the case body 102 is prepared by adding PP resin pellets to paper-resin pellets having a cellulose fiber amount of 41 to 60 weight-% in a ratio of 5:5 (the paper-resin pellets to the PP resin pellets, weight ratio). Thus the amount of the cellulose fiber in the prepared cellulose-resin pellet is 21 to 30 weight-% and the total amount of PP resin and PE resin is 79 to 70 weight-%. The weight of the case body 102 and the covering portion 104 are 10 g and 8 g, respectively. Accordingly, the ratio of the cellulose fiber to the total weight of the case body 102 and the covering portion 104 is 56 to 61 weight-%.

After use, only the case body 102 and the covering portion 104 are discarded, and therefore, the amount of the cellulose fiber in a discarded instant photographic film pack 100 is 56 to 61 weight-%. Consequently, the discarded instant photographic film pack 100 can be incinerated without generating huge heat.

Additionally, a used instant photographic film pack 100 is crushed and kneaded into a mixture of a cellulose fiber and a thermoplastic resin. This mixture is almost the same material as the cellulose-resin composite forming the case body 102 excepting that the amount of cellulose fiber is increased.

Further, since the case body 102 is covered by covering portion 104, by providing different decorations on the covering portion 104, an instant photographic film pack 100 having an attractive appearance can be provided even if the case body 102 has a tasteless colour such as black or dark gray. Therefore, even the above-mentioned mixture coloured in black or dark gray can be reused to form a case body 102 without any problem.

Therefore, by adding the same kind of thermoplastic resin to adjust the composition of the mixture and adding a black pigment such as carbon black, the mixture can be prepared to reuse for forming another case body 102. Thus the instant photographic film pack 100 can be easily recycled.

In addition, the paper-resin and the cardboard can be easily and firmly bonded to each other with a hot-melt glue or a cold glue. Therefore, the case body 102 can be easily bonded to the covering portion 104.

The paper-resin has a structure that the cellulose fiber disperses in a PP resin matrix so that the PP resin matrix is reinforced by the cellulose fiber and thus has a higher rigidity than the PP resin itself. Further, the paper-resin is suitable for injection-moulding.

Thus, the case body 102 is injection-moulded of the above-mentioned paper-resin and thus has rigidity as high as that of a conventional case body moulded of a polystyrene resin. Accordingly, the case body 102 has a high dimensional accuracy. The high rigidity and the high dimensional accuracy of the case body 102 provide the instant photographic film pack 100 with location accuracy as high as that of a conventional instant photographic film pack.

A Third Embodiment

Another example of the instant photographic film pack of the present invention is described in the below.

Figure 22:
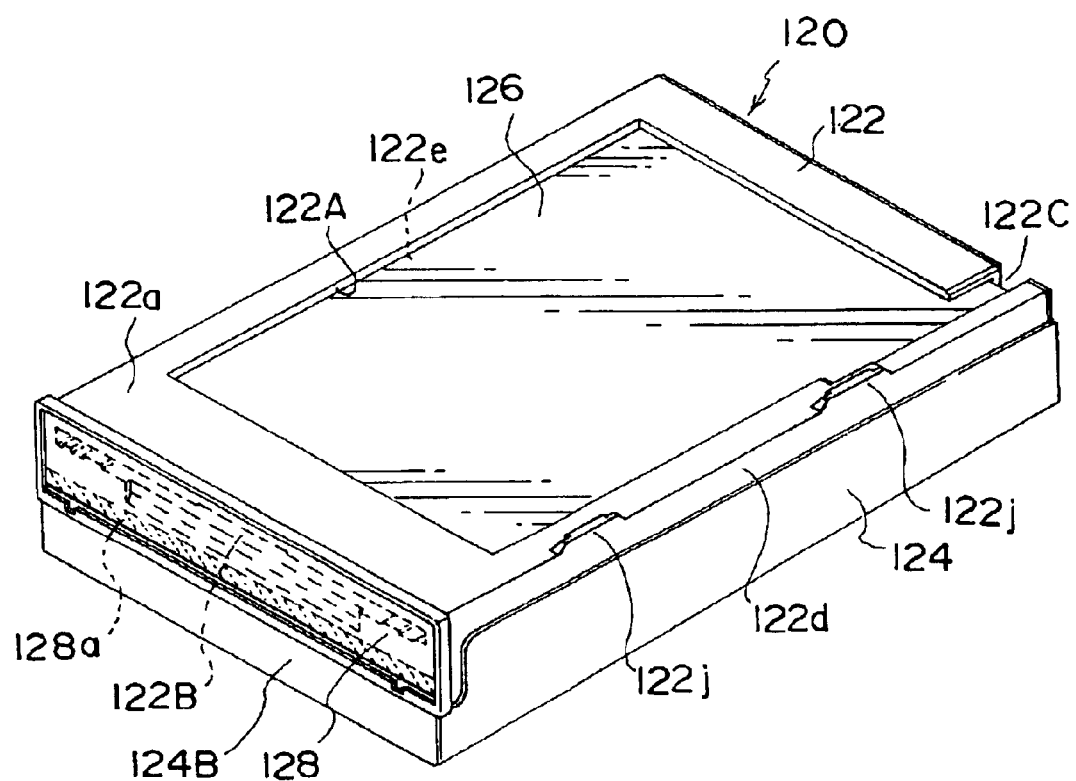
FIG. 22 is a perspective view of an instant photographic film pack of a third embodiment seen from the side of an exposure opening thereof.
Figure 23:
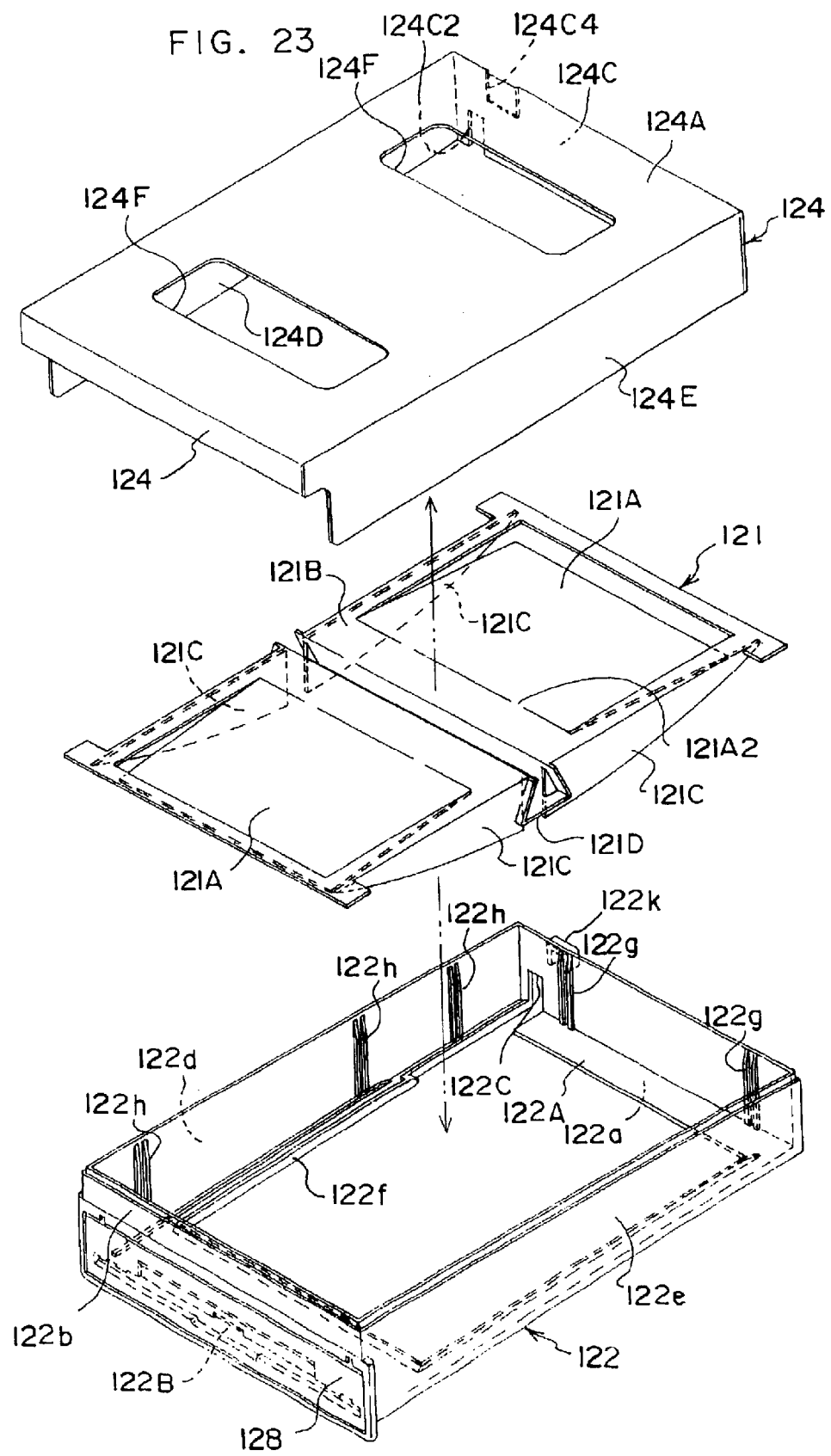
FIG. 23 is an exploded view of the instant photographic film pack of the third embodiment showing an inner construction thereof.
Figure 24:
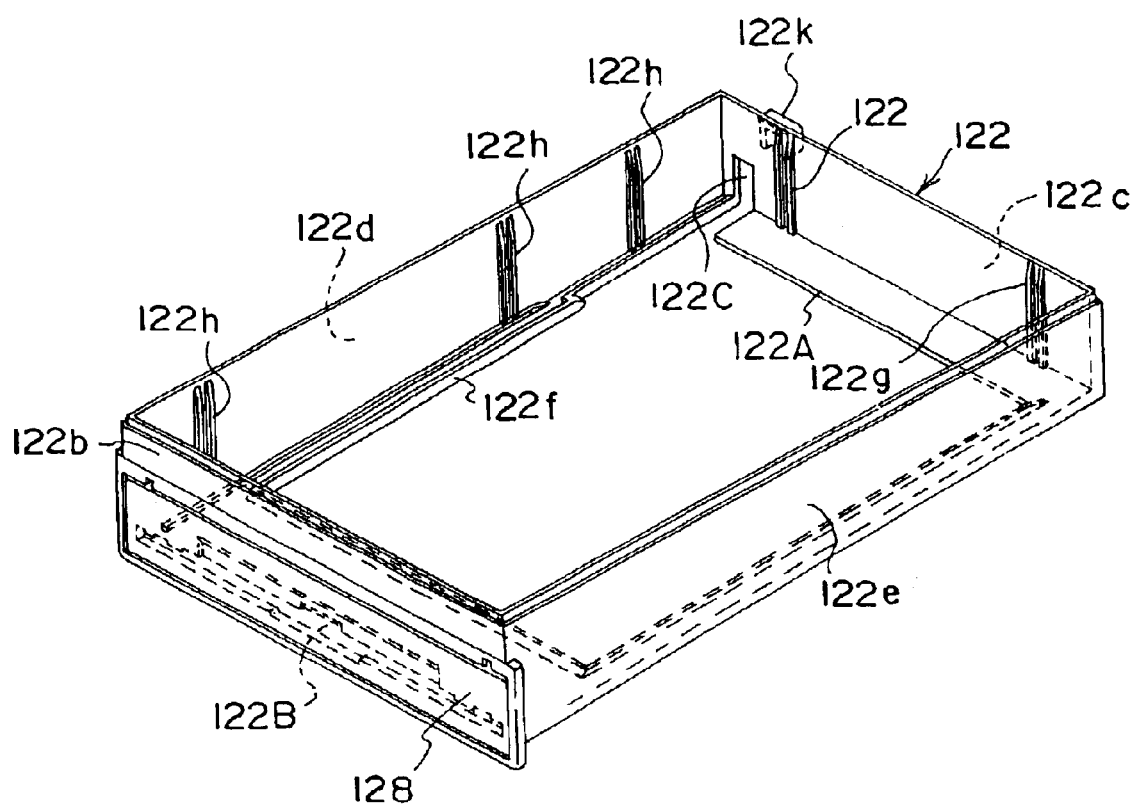
FIG. 24 is a perspective view of a case body of the instant photographic film pack of the third embodiment.

As shown in FIGS. 22 to 24, the instant photographic film pack relating to the third embodiment has a case body 122 with an opening side thereof closed by a covering portion 124 to form a box as a whole. The case body 122 has the same constitution as the case body 102 of the second embodiment.

Except not having the case body-covering portion 104B, the covering portion 124 also has the same constitution as that of the covering portion 104 of the second embodiment. The covering portion 124 can be constructed by folding a one-piece fold-out sheet cut out of cardboard. The covering portion 124 can be also constructed by folding a fold-out sheet cut out of a resin-paper sheet.

The constitution of the covering portion 124 is described below.

The covering portion 124 comprises a covering face-forming portion 124A covering an open side of the case body 122 to form a face facing an exposure side face 102a, end face-forming portions 124B and 124C bordering the covering face-forming portion 124A along the shorter sides thereof, side face-forming portions 124D and 124E bordering the covering face-forming portion 124A along the longer sides thereof. The end face-forming portions 124B and 124C and the side face-forming portions 124D and 124E constitute the side faces of the covering portion 124.

The end face-forming portions 124B and 124C are bonded to end faces 122b and 122c of the case body 122, respectively so as to wrap around the case body 122. Thus, the end face-forming portions 124B is formed in a dimension so as not to cover an ejection slit 122B when the covering portion 124 is fixed to the case body 122. An opening 124C2 exposing a second insertion opening 122C and an opening 124C4 exposing a locating protrusion 122k open on the end face-forming portions 124C.

The side face-forming portions 124D and 124E are bonded to the side faces 102d and 102e of the case body 122, respectively.

In the center of the covering face-forming portion 124A, a pair of first insertion openings 124F are formed. As shown in FIG. 23, a base 121B of a light-shielding member 121 is bonded to the inner surface of the covering face-forming portion 124A so that first light-shielding flaps 121A cover the first insertion openings 124F from inside.

Figure 25:
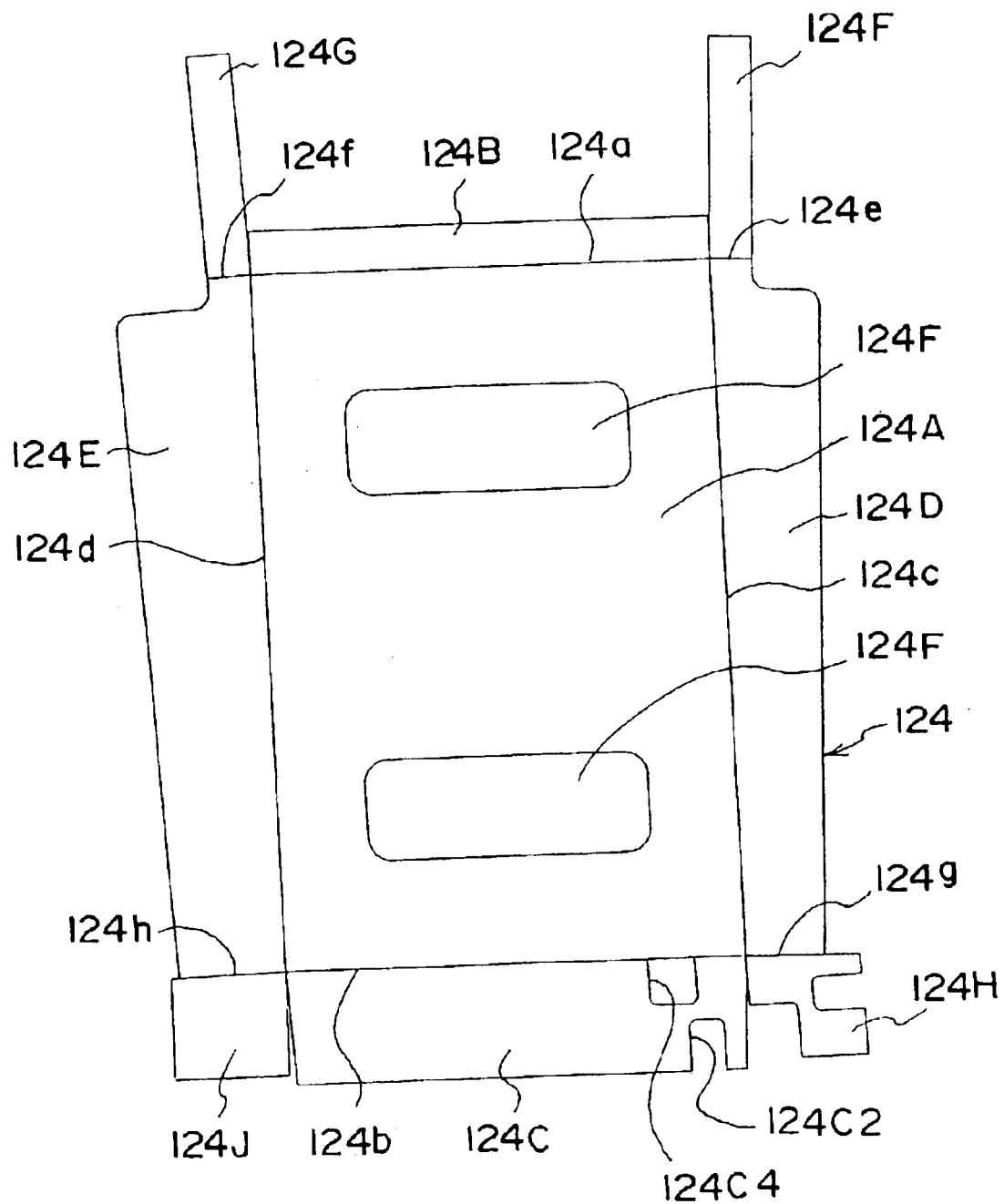
FIG. 25 is a development of a covering portion of the instant photographic film pack of the third embodiment.

As shown in FIG. 25, the covering portion 124 can be formed from a cardboard sheet in the following steps.

First, a cardboard sheet cut out in a shape of the development shown in FIG. 25 is folded at a folding lines 124a, 124b, 124c, and 124d, respectively so that the end face-forming portions 124B and 124C, and the side face-forming portions 124D and 124E are erected perpendicular to the covering face-forming portion 124A.

Then, Reinforcing flaps 124F and 124G respectively bordering the side face-forming portions 124D and 124E at folding lines 124e and 124f are bonded to the inner surface of the end face-forming portions 124B so that the end face-forming portion 124B is fixed to the side face-forming portions 124D and 124E.

And then, reinforcing flaps 124H and 124J bordering the side face-forming portions 124D and 124E at folding lines 124g and 124h are bonded to the inner surface of the end face-forming portion 124C so that the end face-forming portion 124C is fixed to the side face-forming portions 124D and 124E.

The case body 120 and the light shielding member 121 are the same as the case body 102 and the light shielding member 110 of the instant photographic film pack 100.

The instant photographic film pack 120 is loaded and located in a pack chamber 302 of an instant camera 300 in the same way as the instant photographic film pack 100 of the second embodiment.

Removal of a light-shielding cover 126 and exposure and image formation of instant films 200 accommodated inside are performed as described in the second embodiment.

The instant photographic film pack 120 can be incinerated as easily as the instant photographic film pack 100 of the second embodiment, and additionally, easily recycled. Further, the case body 122 has high dimensional accuracy and can be precisely loaded.

The instant photographic film pack 120 is also preferable in that the covering portion 124 has an easier constitution.

It is expected that the greater part of members of the instant photographic film pack of the present invention will be structured by paper materials. However, utilization of used paper, waste paper and the like as materials for the instant photographic film pack is an effective way to reduce environmental impact in that an amount of industrial waste is reduced and waste materials can be suitably recycled. Utilization of used paper, waste paper and the like as materials for the instant photographic film pack is also effective for reducing production costs.

The instant photographic film pack relating to the embodiment described above is to be understood as not limiting the present invention. Obviously, the instant photographic film pack of the present invention includes any film pack that can be realized within a scope satisfying the principal conditions of the present invention.

What is claimed is:

1. An instant photographic film pack loaded in an instant camera comprising:

a case body which accommodates therein a plurality of self-developing type film units, has one side thereof open, and has an exposure opening for providing each one of the self-developing type film units with exposure, an ejection slit for ejecting the self-developing type film units after exposure thereof, and a reference surface serving as a reference to location when the instant photographic film pack is loaded into the instant camera;

a covering portion covering the open side of the case body to form a body; and a light-shielding cover covering the exposure opening and blocking light;

wherein the case body and the covering portion being formed of a paper material, wherein the covering portion comprises a first insertion opening and a first light-shielding piece, the first insertion opening including an opening portion through which a pusher member of an instant camera is inserted to the inside of the case body to push the self-developing type film units toward the exposure opening of the case body when the instant photographic film pack is loaded into the instant camera, and the first light-shielding piece including a flap-like member which covers the first insertion opening to shield light and which is formed so as to fold inside to open the first insertion opening when the pusher member is inserted at the first insertion opening.

2. The instant photographic film pack of claim 1, wherein the case body comprises a second insertion opening and a second light-shielding piece, the second insertion opening including an opening portion through which a pushing-out member of an instant camera is inserted inside the case body to push the self-developing type film units out toward the ejection opening of the case body when the instant photographic film pack is loaded into the instant camera, and the second light-shielding piece including a flap-like member which covers the second insertion opening to shield light and which is formed so as to open the second insertion opening when pushed by the pushing-out member.

3. The instant photographic film pack of claim 2, wherein the light-shielding cover is formed to be ejectable from the ejection slit of the case body.

4. The instant photographic film pack of claim 3, wherein a specific decoration is printed on an outside surface of at least one of the covering portion and the case body.

5. The instant photographic film pack of claim 4, wherein a decoration is also printed on an area outside of an image-forming surface which is disposed on a side of the self-developing type film units opposite from the exposure surface thereof.

6. The instant photographic film pack of claim 4, wherein the case body and the covering portion are formed by folding a single continuous fold-out sheet of he paper material.

7. The instant photographic film pack of claim 2, wherein the case body and the covering portion are formed by folding a single continuous fold-out sheet of the paper material.

8. The instant photographic film pack of claim 7, wherein the fold-out sheet is formed of a cardboard having one layer or two or more layers.

9. The instant photographic film pack of claim 8, wherein the fold-out sheet comprises a light-shielding layer and a printing layer having an outside surface suitable for printing.

10. The instant photographic film pack of claim 9, wherein the fold-out sheet comprises a folding portion that is folded inside or outside to form a corner portion of the case body and the covering portion.

11. The instant photographic film pack of claim 2, wherein case body is formed of a cellulose-resin composite that is a composite of a cellulose fiber an a thermoplastic resin and the covering portion is formed of cardboard.

12. The instant photographic film pack of claim 11, wherein the covering portion is formed by folding a single continuous fold-out sheet of cardboard.

13. The instant photographic film pack of claim 12, wherein the covering portion is formed so as to cover the entire case body from outside.

14. The instant photographic film pack of claim 11, wherein the cellulose fiber is blended in the cellulose-resin composite so that a proportion of the cellulose fiber is 51 weight-% or more in a total weight of the case body formed of the cellulose-resin composite and the covering portion formed of the cellulose-resin composite or the cardboard.

15. The instant photographic film pack of claim 11, wherein the cellulose fiber is blended in the cellulose-resin composite so that a proportion of the cellulose fiber is 51:49 to 75:25 weight-% in a total weight of the case body formed of the cellulose-resin composite and the covering portion formed of the cellulose-resin composite or the cardboard.

16. The instant photographic film pack of claim 11, wherein the cellulose-resin composite is a paper-resin compound material prepared by kneading thermoplastic resin pellets and cellulose fiber pellets formed by crushing, compressing and granulating a source paper.

17. The instant photographic film pack of claim 2, wherein both the case body and the covering portion are formed of a cellulose-resin composite that is a composite of a cellulose fiber and a thermoplastic resin.

18. The instant photographic film pack of claim 17, wherein the cellulose fiber is blended in the cellulose-resin composite so that a proportion of the cellulose fiber is 51 weight-% or more in a total weight of the case body formed of the cellulose-resin composite and the covering portion formed of the cellulose-resin composite or the cardboard.

19. The instant photographic film pack of claim 17, wherein the cellulose fiber is blended in the cellulose-resin composite so that a portion of the cellulose fiber is 51:49 to 75:25 weight-% in a total weight of the case body comprising the cellulose-resin composite and the covering portion comprising the cellulose-resin composite or the cardboard.

20. The instant photographic film pack of claim 17, wherein the cellulose-resin composite is a paper-resin compound material prepared by kneading thermoplastic resin pellets and cellulose fiber pellets formed by crushing, compressing and granulating a source paper.

* * * * *